US012282214B2

(12) United States Patent
Reimer et al.

(10) Patent No.: US 12,282,214 B2
(45) Date of Patent: Apr. 22, 2025

(54) THIN FILM LITHIUM NIOBATE OPTICAL DEVICE HAVING AN ENGINEERED SUBSTRATE FOR HETEROGENEOUS INTEGRATION

(71) Applicant: HyperLight Corporation, Cambridge, MA (US)

(72) Inventors: Christian Reimer, Wellesley, MA (US); Mian Zhang, Cambridge, MA (US)

(73) Assignee: HyperLight Corporation, Cambridge, MA (US)

( * ) Notice: Subject to any disclaimer, the term of this patent is extended or adjusted under 35 U.S.C. 154(b) by 0 days.

(21) Appl. No.: 18/211,170

(22) Filed: Jun. 16, 2023

(65) Prior Publication Data

US 2023/0384627 A1    Nov. 30, 2023

Related U.S. Application Data

(63) Continuation-in-part of application No. 17/843,906, filed on Jun. 17, 2022, which is a continuation of
(Continued)

(51) Int. Cl.
*G02F 1/03* (2006.01)
*G02F 1/035* (2006.01)

(52) U.S. Cl.
CPC ...... *G02F 1/0356* (2013.01); *G02F 2201/063* (2013.01); *G02F 2201/122* (2013.01); *G02F 2202/20* (2013.01)

(58) Field of Classification Search
CPC ............ G02F 1/0356; G02F 2201/063; G02F 2201/122; G02F 2202/20
See application file for complete search history.

(56) References Cited

U.S. PATENT DOCUMENTS 3,877,782 A    4/1975    Kaminow
4,005,927 A    2/1977    Caton
(Continued)

FOREIGN PATENT DOCUMENTS

CN    1432846    7/2003
CN    101006382    7/2007
(Continued)

OTHER PUBLICATIONS

He et al. High-performance hybrid silicon and lithium niobate Mach-Zehnder modulators for 100 Gbits-1 and beyond. Nat. Photonics 13, 359-364 (May 2019). https://doi.org/10.1038/s41566-019-0378-6 (Year: 2019).*
(Continued)

*Primary Examiner* — Peter Radkowski
(74) *Attorney, Agent, or Firm* — Van Pelt, Yi & James LLP

(57) ABSTRACT

An electro-optic device is described. The electro-optic device includes a substrate, an insulator on the substrate, an optical structure on the insulator and an electrode proximate to at least a portion of the optical structure. The substrate includes a trench region having a plurality of trenches therein. The trench region has an effective microwave index based on a substrate material and the plurality of trenches. The insulator is on the substrate. The optical structure is on the insulator. The optical structure has a thin film electro-optic layer including lithium. The electrode is proximate to a portion of the optical structure.

22 Claims, 7 Drawing Sheets

Related U.S. Application Data application No. 17/102,047, filed on Nov. 23, 2020, now Pat. No. 11,567,353.

(60) Provisional application No. 63/353,501, filed on Jun. 17, 2022, provisional application No. 63/112,867, filed on Nov. 12, 2020, provisional application No. 63/033,666, filed on Jun. 2, 2020, provisional application No. 62/941,139, filed on Nov. 27, 2019.

(56) References Cited

U.S. PATENT DOCUMENTS

| | | |
|---|---|---|
| 4,251,130 A | 2/1981 | Marcatili |
| 4,372,643 A | 2/1983 | Liu |
| 4,380,364 A | 4/1983 | Marcatili |
| 4,448,479 A | 5/1984 | Alferness |
| 4,468,086 A | 8/1984 | Liu |
| 4,553,810 A | 11/1985 | Alferness |
| 5,566,257 A | 10/1996 | Jaeger |
| 5,619,607 A | 4/1997 | Djupsjobacka |
| 6,129,864 A | 10/2000 | Imaeda |
| 6,192,167 B1 | 2/2001 | Kissa |
| 6,310,700 B1 | 10/2001 | Betts |
| 6,483,953 B1 | 11/2002 | McBrien |
| 6,522,793 B1 | 2/2003 | Szilagyi |
| 6,567,203 B1 | 5/2003 | Hill |
| 6,580,840 B1 | 6/2003 | McBrien |
| 6,647,158 B2 | 11/2003 | Betts |
| 6,678,430 B1 | 1/2004 | Noe |
| 6,760,493 B2 | 7/2004 | Pruneri |
| 6,950,580 B2 | 9/2005 | Mitomi |
| 6,958,852 B2 | 10/2005 | Aoki |
| 7,027,668 B2 | 4/2006 | Tavlykaev |
| 7,035,485 B2 | 4/2006 | Kondo |
| 7,382,943 B1 | 6/2008 | Heaton |
| 7,400,787 B2 | 7/2008 | Burns |
| 7,426,321 B2 | 9/2008 | Eriksson |
| 7,426,326 B2 | 9/2008 | Moeller |
| 7,502,530 B2 | 3/2009 | Kondo |
| 7,801,400 B2 | 9/2010 | Sugiyama |
| 7,809,216 B2 | 10/2010 | Cox, III |
| 7,869,669 B2 | 1/2011 | Mitomi |
| 8,094,359 B1 | 1/2012 | Matsko |
| 8,300,992 B2 | 10/2012 | Murata |
| 8,411,353 B2 | 4/2013 | Kashyap |
| 8,549,740 B1 | 10/2013 | Hwu |
| 8,644,647 B2 | 2/2014 | Ichikawa |
| 8,737,773 B2 | 5/2014 | Motoya |
| 9,335,568 B1 | 5/2016 | Yap |
| 9,470,952 B2 | 10/2016 | Dagli |
| 9,523,871 B2 | 12/2016 | Kitamura |
| 9,664,931 B1 | 5/2017 | Yap |
| 9,671,670 B2 | 6/2017 | Hollis |
| 9,733,543 B2 | 8/2017 | Dagli |
| 9,746,743 B1 | 8/2017 | Rabiei |
| 9,939,709 B2 | 4/2018 | Iwatsuka |
| 10,018,888 B2 * | 7/2018 | Thaniyavarn ......... G02F 1/2255 |
| 10,027,032 B2 | 7/2018 | Kirino |
| 10,088,734 B2 | 10/2018 | Kondou |
| 10,133,142 B2 | 11/2018 | Doerr |
| 10,168,596 B2 | 1/2019 | Williams |
| 10,197,884 B2 | 2/2019 | Dagli |
| 10,295,844 B2 * | 5/2019 | Kissa ................ G02F 1/0316 |
| 10,320,083 B2 | 6/2019 | Kirino |
| 10,367,664 B2 | 7/2019 | Welch |
| 10,705,354 B2 | 7/2020 | Menezo |
| 10,888,875 B2 | 1/2021 | Oh |
| 10,890,787 B2 | 1/2021 | Kawamura |
| 11,009,659 B2 | 5/2021 | Ward |
| 11,287,720 B2 | 3/2022 | Hayashi |
| 11,448,907 B2 | 9/2022 | Tai |
| 11,567,353 B2 | 1/2023 | Kharel |
| 2001/0008589 A1 | 7/2001 | Sasame |
| 2002/0048076 A1 | 4/2002 | Kondo |
| 2002/0071622 A1 | 6/2002 | Betts |
| 2002/0154842 A1 | 10/2002 | Betts |
| 2003/0002766 A1 | 1/2003 | Pruneri |
| 2003/0228081 A1 | 12/2003 | Tavlykaev |
| 2006/0228065 A1 | 10/2006 | Burns |
| 2006/0251425 A1 * | 11/2006 | Kupershmidt ......... G02B 6/022 398/147 |
| 2007/0009195 A1 | 1/2007 | Eriksson |
| 2007/0058896 A1 | 3/2007 | Toyoda |
| 2008/0089633 A1 | 4/2008 | Moeller |
| 2008/0227410 A1 | 9/2008 | Cox |
| 2009/0290830 A1 | 11/2009 | Mitomi |
| 2010/0067840 A1 | 3/2010 | Sugiyama |
| 2010/0232736 A1 | 9/2010 | Ichikawa |
| 2011/0038034 A1 | 2/2011 | Kashyap |
| 2011/0069924 A1 | 3/2011 | Murata |
| 2011/0158576 A1 | 6/2011 | Kissa |
| 2011/0262071 A1 | 10/2011 | Mitomi |
| 2012/0230627 A1 | 9/2012 | Motoya |
| 2014/0104666 A1 | 4/2014 | Minoia |
| 2014/0205229 A1 * | 7/2014 | Thaniyavarn ........... G02F 1/225 385/3 |
| 2015/0147038 A1 | 5/2015 | Asai |
| 2016/0011439 A1 | 1/2016 | Kitamura |
| 2016/0062155 A1 | 3/2016 | Ichikawa |
| 2016/0139485 A1 | 5/2016 | Winzer |
| 2016/0139486 A1 | 5/2016 | Dagli |
| 2016/0202592 A1 | 7/2016 | Hollis |
| 2016/0291352 A1 * | 10/2016 | Kissa ................ G02F 1/0316 |
| 2016/0313579 A1 | 10/2016 | Yokoyama |
| 2017/0023842 A1 | 1/2017 | Dagli |
| 2017/0052424 A1 | 2/2017 | Iwatsuka |
| 2017/0082877 A1 | 3/2017 | Arimoto |
| 2017/0110802 A1 | 4/2017 | Kirino |
| 2017/0250758 A1 | 8/2017 | Kikuchi |
| 2017/0285437 A1 | 10/2017 | Doerr |
| 2017/0307954 A1 | 10/2017 | Dagli |
| 2018/0120666 A1 | 5/2018 | Kondou |
| 2018/0301819 A1 | 10/2018 | Kirino |
| 2018/0309207 A1 | 10/2018 | Kirino |
| 2018/0329269 A1 | 11/2018 | Ward |
| 2018/0341164 A1 | 11/2018 | Williams |
| 2018/0361400 A1 | 12/2018 | Oh |
| 2019/0025615 A1 | 1/2019 | Kawamura |
| 2019/0196099 A1 | 6/2019 | Watanuki |
| 2019/0227350 A1 | 7/2019 | Puckett |
| 2019/0243167 A1 | 8/2019 | Menezo |
| 2019/0293972 A1 | 9/2019 | Sasaki |
| 2019/0296443 A1 | 9/2019 | Kirino |
| 2019/0346625 A1 | 11/2019 | Cheng |
| 2019/0391415 A1 | 12/2019 | Lipson |
| 2021/0080796 A1 | 3/2021 | Kissa |
| 2021/0157177 A1 | 5/2021 | Kharel |
| 2021/0364696 A1 | 11/2021 | Reano |
| 2021/0373364 A1 | 12/2021 | Zhang |
| 2022/0146901 A1 | 5/2022 | Miyazaki |
| 2022/0197104 A1 | 6/2022 | Miyazaki |
| 2023/0273467 A1 | 8/2023 | Ozaki |

FOREIGN PATENT DOCUMENTS

| | | |
|---|---|---|
| CN | 109844621 | 6/2019 |
| CN | 110609399 | 12/2019 |
| CN | 111061071 | 9/2021 |
| EP | 0152996 | 8/1985 |
| JP | H09211402 | 8/1997 |
| JP | 2001066561 | 3/2001 |
| JP | 2004341147 | 12/2004 |
| JP | 2005506554 | 3/2005 |
| JP | 2006065044 | 3/2006 |
| JP | 2007171452 | 7/2007 |
| JP | 2007304424 | 11/2007 |
| JP | 2009048021 | 3/2009 |
| JP | 2015118371 | 6/2015 |
| JP | 2019174749 | 10/2019 |
| WO | 2008108154 | 9/2008 |
| WO | 2018031916 | 2/2018 |
| WO | 2019180922 | 9/2019 |

(56) References Cited

FOREIGN PATENT DOCUMENTS

| | | |
|---|---|---|
| WO | 2019213140 | 11/2019 |
| WO | 2023045610 | 3/2023 |

OTHER PUBLICATIONS

Tadesse et al., Sub-optical wavelength acoustic wave modulation of integrated photonic resonators at microwave frequencies. Nat Commun. Nov. 17, 2014;5:5402. doi: 10.1038/ncomms6402. PMID: 25400144. (Year: 2014).*

Yang et al., Surface acoustic waves in acoustic superlattice lithium niobate coated with a waveguide layer. AIP Advances Apr. 1, 2017; 7 (4): 045206. https://doi.org/10.1063/1.4980057 (Year: 2017).*

Bacon et al., Acoustic waves generated by pulsed microwaves in viscoelastic rods: Modeling and experimental verification. J. Acoust. Soc. Am. Sep. 1, 2001; 110 (3): 1398-1407. https://doi.org/10.1121/1.1391241 (Year: 2001).*

Dong et al., Characterization of the Brillouin grating spectra in a polarization-maintaining fiber, Opt. Express 18, 18960-18967 (2010) (Year: 2010).*

Aliev et al., Porous silicon bulk acoustic wave resonator with integrated transducer. Nanoscale Res Lett. Jul. 9, 2012;7(1):378. doi: 10.1186/1556-276X-7-378. PMID: 22776697; PMCID: PMC3508590 (Year: 2012).*

Cai et al., Acousto-optical modulation of thin film lithium niobate waveguide devices, Photon. Res. 7, 1003-1013 (2019) (Year: 2019).*

Chang et al., Thin film wavelength converters for photonic integrated circuits, Optica 3, 531-535 (2016) (Year: 2016).*

Fu et al., (2017). Advances in piezoelectric thin films for acoustic biosensors, acoustofluidics and lab-on-chip applications. Progress In Materials Science, 89, 31-91. https://doi.org/10.1016/j.pmatsci.2017.04.006 (Year: 2017).*

Ghadimi et al., Elastic strain engineering for ultralow mechanical dissipation, Science 360, 764-768 (2018) (Year: 2018).*

He et al., High-Performance Hybrid Silicon and Lithium Niobate Mach-Zehnder Modulators for 100 Gbit/s and Beyond, Nature Photonics 2019, 13(5): 359-364, arXiv:1807.10362v2 [physics.app-ph] 2018 (Year: 2018).*

Safavi-Naeini et al., Design of optomechanical cavities and waveguides on a simultaneous bandgap phononic-photonic crystal slab, Opt. Express 18, 14926-14943 (2010) (Year: 2010).*

Safavi-Naeini et al., Two-Dimensional Phononic-Photonic Band Gap Optomechanical Crystal Cavity, Phys. Rev. Lett. 112, 153603—Published Apr. 14, 2014 (Year: 2014).*

Santos et al., Hybrid confinement of optical and mechanical modes in a bullseye optomechanical resonator, Opt. Express 25, 508-529 (2017) (Year: 2017).*

Tadesse et al., Sub-optical wavelength acoustic wave modulation of integrated photonic resonators at microwave frequencies. Nat Commun 5, 5402 (2014). https://doi.org/10.1038/ncomms6402 (Year: 2014).*

Van Laer et al., Unifying Brillouin scattering and cavity optomechanics in silicon photonic wires, in CLEO: 2015, OSA Technical Digest (online) (Optica Publishing Group, 2015), paper STh41.4. (Year: 2015).*

Van Laer et al., Unifying Brillouin scattering and cavity optomechanics, Physical Review A 93, 053828 (2016) (Year: 2016).*

Weigel et al., Bonded thin film lithium niobate modulator on a silicon photonics platform exceeding 100 GHz 3-dB electrical modulation bandwidth, Opt. Express 26, 23728-23739 (2018) (Year: 2018).*

Zhang et al., Sound transmission properties assisted by the phase resonances of composite acoustic gratings. J. Appl. Phys. Feb. 28, 2016; 119 (8): 084902. https://doi.org/10.1063/1.4942444 (Year: 2016).*

Akiyama et al., "High-speed and efficient silicon modulator based on forward-biased pin diodes", Frontiers in Physics, V. 2, DOI 10.3389/fphy.2014.00065m 2014 (Year: 2014).

Annoymous "UV 210 Positive DUV Photoresist" Rohm and Haas Electronic Materials Microelectronic Technologies, Apr. 2004.

Boes et al., Improved second harmonic performance in periodically poled LNOI waveguides through engineering of lateral leakage, Opt. Express 27, 23919-23928 (2019) (Year: 2019).

Boes et al., Status and Potential of Lithium Niobate on Insulator (LNOI) for Photonic Integrated Circuits, Laser Photonics Rev. 2018, 1700256 (Year: 2018).

Burrows et al., "Slot-vee antenna-coupled electro-optic modulator," Proc. SPIE 3463, Photonics and Radio Frequency II, (Nov. 3, 1998); doi: 10.1117/12.330399 (Year: 1998).

Caspar et al., High-Aspect-Ratio LiNbO3 Ridge Waveguide With Vertical Buffer Layer and Enhanced Electro-Optical Efficiency, Journal of Lightwave Technology, vol. 36, No. 13, Jul. 1, 2018 (Year: 2018).

Costanzo et al., Benzocyclobutene as Substrate Material for Planar Millimeter-Wave Structures: Dielectric Characterization and Application, J Infrared Milli Terahz Waves (2010) 31 :66-77 (Year: 2010).

Costanzo et al., Millimeter-Waves Structures on Benzocyclobutene Dielectric Substrate, Radioengineering, vol. 20, No. 4, Dec. 2011 (Year: 2011).

Ding et al., High-Speed Silicon Modulator With Slow-Wave Electrodes and Fully Independent Differential Drive, Journal of Lightwave Technology, vol. 32, No. 12, Jun. 15, 2014 (Year: 2014).

Dogru et al., Traveling Wave Electrodes for Substrate Removed Electro-Optic Modulators With Buried Doped Semiconductor Electrodes, IEEE Journal of Quantum Electronics, vol. 49, No. 7, Jul. 2013 (Year: 2013).

Dris et al., A programmable, multi-format phoitonic transceiver platform enabling flexible networks, We. D5.2, ICTON 2015. (Year:2015).

Dummer et al., Periodic Loading and Selective Undercut Etching for High-Impedance Traveling-Wave Electroabsorption Modulators, OThC6.pdf, OFC/NFOEC 2008 (Year: 2008).

EOSpace, 40+ GB/S Modulators, 2019.

Fang et al. "Monolithic integration of a lithium niobate microresonator with a free-standing waveguide using femtosecond laser assisted ion beam writing", Nature, Scientific Reports; 7:45610, pp. 1-6 (Year: 2017).

Hinakura et al., Electro-optic phase matching in a Si photonic crystal slow light modulator using meander-line electrodes, Optics Express, V. 28, N. 9, 2018 (Year: 2018).

Honardoost et al. "High-Speed Modeling of Ultracompact Electrooptic Modulators", Journal of Lightwave Technology, vol. 36, No. 24, pp. 5893-5902 (Year: 2018).

Honardoost et al., Towards Subterahertz Bandwidth Ultracompact Lithium Niobate Electooptic Modulators, Optics Express, vol. 27, No. 5, Mar. 4, 2019, pp. 6495-6501.

Jeremy Witzens, High-Speed Silicon Photonics Modulators, Proceedings of the IEEE, vol. 106, No. 12, Dec. 2018 (Year: 2018).

Kharel et al., "Breaking voltage-bandwidth limits in integrated lithium niobate modulators using micro-structured electrodes," Optica 8, 357-363 (2021).

Lewen et al., Ultra high-speed segmented traveling-wave electroabsorption modulators, OSA/OFC 2003, PD38-1 (Year: 2003).

Li et al., Analysis of Segmented Traveling-Wave Optical Modulators, Journal of Lightwave Technology, vol. 22, No. 7, Jul. 2004, pp. 1789-1796.

Li et al., Silicon intensity Mach-Zehnder modulator for single lane 100 GB/s applications, Photonics Research, V. 6, N. 2, 2018 (Year: 2018).

Mercante et al., Thin film lithium niobate electro-optic modulator with terahertz operating bandwidth, Optics Express, V. 28, N. 11, 2018 (Year: 2018).

Patel et al., Design, analysis, and transmission system performance of a 41 GHz silicon photonic modulator, Optics Express, V. 23, N. 11, 2015. (Year: 2015).

Rao et al., "High-performance and linear thin-film lithium niobate Mach-Zehnder modulators on silicon up to 50 GHz," Opt. Lett. 41, 5700-5703 (2016) (Year: 2016).

Rao et al., Heterogeneous Microring and Mach-Zehnder Modulators Based on Lithium Niobate and Chalcogenide Glasses on Silicon, Opt. Express 23, 22746-22752 (2015) (Year: 2015).

(56) References Cited

OTHER PUBLICATIONS

Robert G. Walker, High-Speed III-V Semiconductor Intensity Modulators, IEEE Journal of Quantum Electronics, vol. 27, No. 3, Mar. 1991.

Shao et al., Microwave-to-Optical Conversion using Lithium Niobate Thin-Film Acoustic Resonators, Optica 6, 1498-1505 (2019), available Jul. 11, 2019 at https://arxiv.org/pdf/1907.08593.pdf (Year: 2019).

Shin et al., Conductor Loss of Capacitively Loaded Slow Wave Electrodes for High-Speed Photonic Devices, Journal of Lightwave Technology, vol. 29, No. 1, Jan. 1, 2011 (Year: 2011).

Shin et al., Bulk Undoped GaAs-AlGaAs Substrate-Removed Electrooptic Modulators With 3.7-V-cm Drive Voltage at 1.55 micron, IEEE Photonics Technology Letters, vol. 18, No. 21, Nov. 1, 2006 (Year: 2006).

Shin et al., Ultralow Drive Voltage Substrate Removed GaAs/AlGaAs Electro-Optic Modulators at 1550 nm, IEEE Journal of Selected Topics in Quantum Electronics, vol. 19, No. 6, Nov./Dec. 2013 (Year: 2013).

Soltani et al., Efficient quantum microwave-to-optical conversion using electro-optic nanophotonic coupled resonators, Phys. Rev. A 96, 043808—Published Oct. 5, 2017 (Year: 2017).

Stenger et al., "Low Loss and Low Vpi Thin Film Lithium Niobate on Quartz Electro-optic Modulators," 2017 European Conference on Optical Communication (ECOC), Gothenburg, 2017, pp. 1-3, doi: 10.1109/ECOC.2017.8346144. (Year: 2017).

Stepanenko et al., "Optimization of RF electrodes for electro-optic modulator based on quantum-confined Stark effect", 2019 J. Phys.: Conf. Ser. 1145 012028 (Year: 2019).

Thorlabs, Lithium Niobate Electro-Optic Modulators, Fiber-Coupled, Nov. 12, 2020, pp. 1-4.

Wang et al., "Measurement Method of Electro-Optic Coefficients using Photoelastic Modulation," Appl. Opt. 58, 4271-4276 (2019) (Year: 2019).

Wang et al., "Integrated High Quality Factor Lithium Niobate Microdisk Resonators" Optical Sciences of America, vol. 22 No. 25, Dec. 4, 2014.

Wang et al., "Nanophotonic lithium niobate electro-optic modulators," Opt. Express 26, 1547-1555, (2018); arXiv: 1701.06470v1 [physics.optics] Jan. 23, 2017 (Year: 2017).

Wang et al., Design of Ultra-Thin Dielectric Waveguide Meander Line for 850 GHz Traveling Wave Tube, 2018 IEEE International Vacuum Electronics Conference (IVEC), Monterey, CA, 2018, pp. 395-396, doi: 10.1109/IVEC.2018.8391578 (Year: 2018).

Wang et al., Integrated Lithium Niobate Electro-optic Modulators Operating at CMOS-Compatible Voltages, Springer Nature Limited, Oct. 4, 2018, vol. 562, pp. 101-112.

Wang et al., Lithium Niobate Nonlinear Nanophotonics, Dissertation, SEAS, Harvard University, 2017 (Year: 2017).

Wang et al., Ultrahigh-efficiency wavelength conversion in nanophotonic periodically poled lithium niobate waveguides, Optica, V. 5, N.11, 2018 (Year: 2018).

Xu et al., High-Performance Coherent Optical Modulators Based on Thin-Film Lithium Niobate Platform, Aug. 6, 2020, pp. 1-7.

Yudistira et al., Surface Acoustic Wave Generation in ZX-cut LinbO3 Superlattices Using Coplanar Electrodes, Appl. Phys. Lett. 95, 052901, (2009) https://doi.org/10.1063/1.3190518 (Year: 2009).

Zhou et al., Silicon Photonics Carrier Depletion Modulators Capable of 85Gbaud 16QAM and 64Gbaud 64QAM, 2019.

Kim et al., "Effects of parasitic modes in high-speed LiNb03 optical modulators," Opt. Express 12, 2568-2573 (2004) (Year: 2004).

Xu et al., Dual-Polarization Thin-Film Lithium Niobate In-Phase Quadrature Modulators for Terabit-per-Second Transmission, vol. 9, No. 1, Jan. 2022, pp. 61-62.

Alam et al., Microwave characterization of lithium niobate electrooptic modulators with traveling wave electrodes, International Conference on Computer and Communication Engineering, 2008, pp. 118-122.

Krasnokutska et al., Ultra-low Loss Photonic Circuits in Lithium Niobate on Insulator, Optics Express, vol. 26, No. 2, pp. 897-904 (2018).

Tu et al., 50-GB/s silicon optical modulator with traveling-wave electrodes, Opt. Express 21, 2013, pp. 12776-12782.

Haffner et al., Nano-opto-electro-mechanical switches operated at CMOS-level voltages, Science, vol. 366, Nov. 15, 2019, pp. 860-864.

Hu et al., Preparation and microwave dielectric properties of SiO2 ceramics by aqueous Sol-Gel technique, Journal of Alloys and Compounds, vol. 559, 2013, pp. 129-133.

Kuypers et al., Green's function analysis of Lamb wave resonators, IEEE Ultrasonics Symposium, 2008, pp. 1548-1551.

Rueda et al., Efficient microwave to optical photon conversion: an electro-optical realization, Optica, vol. 3, No. 6, Jun. 2016, pp. 597-604.

Wang et al., Design and Fabrication of SO Lamb-Wave Thin-Film Lithium Niobate Micromechanical Resonators, Journal of Microelectromechanical Systems, vol. 24, No. 2, Apr. 2015, pp. 300-308.

Yang et al., Characteristics of coplanar waveguide on lithium niobate crystals as a microwave substrate, Journal of Applied Physics 101, 2007, 5 pages.

\* cited by examiner

THIN FILM LITHIUM NIOBATE OPTICAL DEVICE HAVING AN ENGINEERED SUBSTRATE FOR HETEROGENEOUS INTEGRATION

CROSS REFERENCE TO OTHER APPLICATIONS

This application claims priority to U.S. Provisional Patent Application No. 63/353,501 entitled THIN FILM LITHIUM NIOBATE OPTICAL DEVICE HAVING AN ENGINEERED SUBSTRATE FOR HETEROGENEOUS INTEGRATION filed Jun. 17, 2022 which is incorporated herein by reference for all purposes.

This application is a continuation in part of U.S. patent application Ser. No. 17/843,906 entitled ELECTRO-OPTIC DEVICES HAVING ENGINEERED ELECTRODES filed Jun. 17, 2022, which is a continuation of U.S. patent application Ser. No. 17/102,047, now U.S. Pat. No. 11,567,353, entitled ELECTRO-OPTIC DEVICES HAVING ENGINEERED ELECTRODES filed Nov. 23, 2020, which claims priority to U.S. Provisional Patent Application No. 63/033,666 entitled HIGH PERFORMANCE OPTICAL MODULATOR filed Jun. 2, 2020; U.S. Provisional Patent Application No. 62/941,139 entitled THIN-FILM ELECTRO-OPTIC MODULATORS filed Nov. 27, 2019; and U.S. Provisional Patent Application No. 63/112,867 entitled BREAKING VOLTAGE-BANDWIDTH LIMIT IN INTEGRATED LITHIUM NIOBATE MODULATORS USING MICRO-STRUCTURED ELECTRODES filed Nov. 12, 2020; all of which are incorporated herein by reference for all purposes.

BACKGROUND OF THE INVENTION

Electro-optic devices may utilize thin film electro-optic (TFEO) materials that contain lithium, such as thin film lithium niobate (TFLN) and thin film lithium tantalate (TFLT). In optical modulators, for example, the optical signal carried by a waveguide is modulated by a microwave signal carried in electrodes in proximity to the waveguide. Lithium-containing TFEO materials are desirable for use in photonics devices such as optical modulators because of their large change in index of refraction in response to a given applied electric field. Electro-optic devices including lithium-containing TFEO materials are also desired to be integrated with photonics devices using other materials. For example, lithium-containing TFEO devices may be desired to be integrated with silicon photonics (SiPh) devices to form heterogeneous devices.

Integration of electro-optic devices using lithium-containing TFEO materials with other photonics devices encounters significant obstacles. This is particularly true for integration of lithium-containing TFEO devices with SiPh devices. For example, TFLN and/or TFLT devices utilize a thick buried oxide (BOX) layer that is typically formed of $SiO_2$. The BOX layer is between the lithium-containing TFEO component (e.g. waveguide) and an underlying silicon substrate. These BOX layers are generally at least five micrometers to ten micrometers thick. The thick BOX layers allow the microwave mode for microwave signals carried by the electrodes to be within the BOX layer and not extend to the underlying silicon substrate. As a result, the thick BOX layer improves the matching between the speed of the optical signal in the lithium-containing TFEO waveguide and the speed of the microwave signal carried by electrodes. However, SiPh devices utilize a thinner BOX layer. For example, the BOX layer may be as thin as one micrometer. The use of such thin BOX layers in an integrated device including both SiPh and lithium-containing TFEO can adversely affect performance of lithium-containing TFEO component(s). Accordingly, a mechanism for improving the ability of TFEO materials, such as TFLN and/or TFLT, to be integrated with devices such as SiPh devices is desired.

BRIEF DESCRIPTION OF THE DRAWINGS

Various embodiments of the invention are disclosed in the following detailed description and the accompanying drawings.

DETAILED DESCRIPTION

Figure 1:
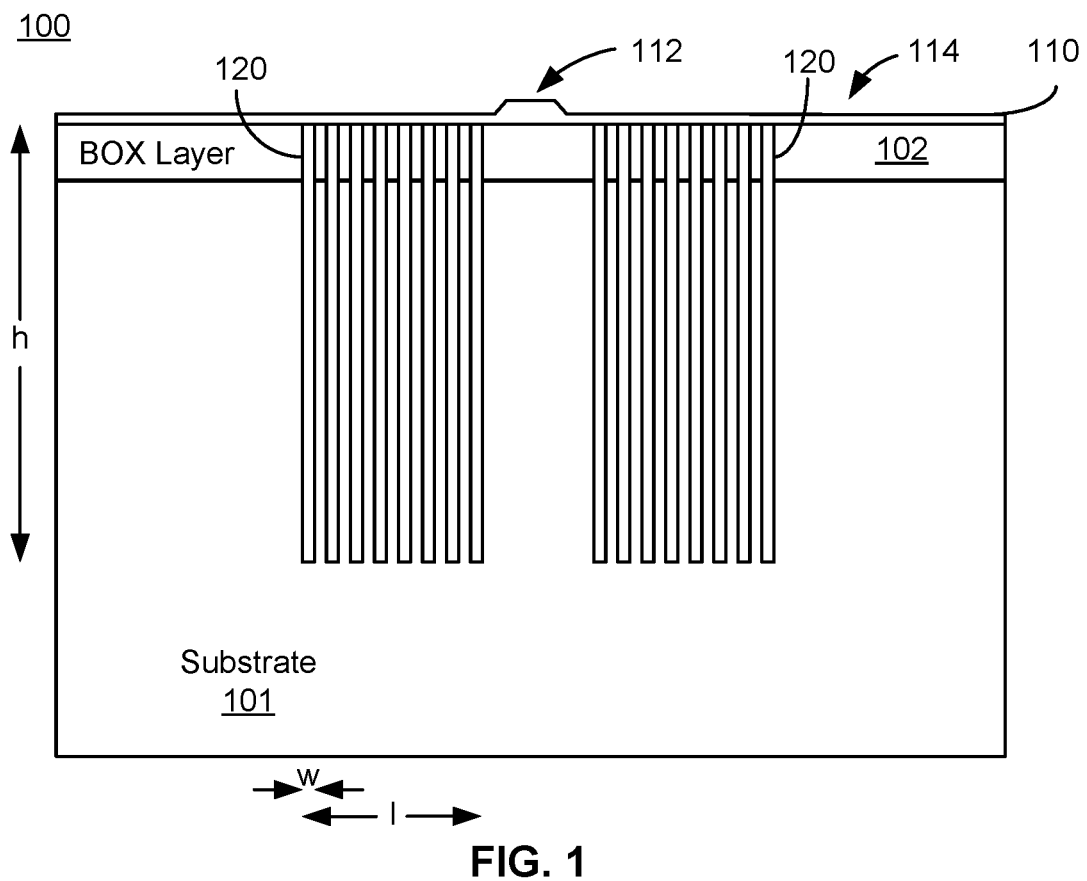
FIG. 1 depicts a cross-sectional view of a portion of an embodiment of an electro-optic device.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Electro-optic devices may utilize thin film electro-optic (TFEO) materials. Lithium-containing TFEO materials include thin film lithium niobate (TFLN) and thin film lithium tantalate (TFLT). The optical signal carried by the lithium-containing TFEO waveguide can be modulated by a microwave signal carried in electrodes that are in proximity to the TFEO waveguide. TFLN and/or TFLT have a large modulation in the index of refraction for a given electric field. Thus, such materials are desirable for use in photonics devices such as optical modulators.

Integration of electro-optic devices using lithium-containing TFEO materials such as TFLN and/or TFLT may face challenges. This is particularly true when such lithium-containing electro-optic materials are combined with materials such as silicon. For example, for TFLN and/or TFLT devices, a thick buried oxide (BOX) layer is generally desired. The thick BOX layer is typically formed of $SiO_2$. Such layers are generally desired to be at least five micrometers thick for TFLN and/or TFLT devices. For example, five to ten micrometers of $SiO_2$ may frequently be used as the BOX layer. In some cases, the BOX layer is desired to have a thickness of ten micrometers or more. Such thick BOX layers allow the microwave mode for microwave signals carried by the electrodes to be within the BOX layer and not extend significantly (or at all) to the underlying silicon substrate. Thus, the index of refraction (i.e. the microwave index) for the microwave mode includes the microwave index of the BOX layer, rather than the underlying silicon substrate. Such thick BOX layers thus improve the ability of the speed of the optical signal in the TFLN and/or TFLT waveguide to be matched with the speed of the microwave signal carried by electrodes. However, silicon photonics (SiPh) devices generally utilize a thinner BOX layer. For example, the BOX layer may be three micrometers or less. In some cases, the BOX layer may be as thin as one micrometer. The use of such thin BOX layers can adversely affect performance of TFEO devices. For example, a mismatch between the optical signal carried by the waveguide formed of lithium-containing TFEO materials and the microwave signal may result. Thus, the desired modulation may not be obtained. Accordingly, a mechanism for improving the ability of TFEO materials, such as TFLN and/or TFLT, to be integrated with devices such as SiPh devices.

An electro-optic device is described. The electro-optic device includes a substrate, an insulator on the substrate, an optical structure on the insulator, and an electrode proximate to at least a portion of the optical structure. The substrate includes a trench region having trenches therein. The trench region has an effective microwave index based on a substrate material and the plurality of trenches. In some embodiments, the effective microwave index is less than 2.5. The optical structure is on the insulator. In some embodiments, the insulator does not exceed three micrometers in thickness. The optical structure has a thin film electro-optic layer including lithium. The electrode is proximate to a portion of the optical structure. In some embodiments, a photonics structure, such as a silicon photonic waveguide, is between the optical structure and the trenches.

In some embodiments, the electrode is configured to carry an electrode signal having a microwave frequency. In such embodiments, the trenches have a periodicity smaller than half of a wavelength corresponding to the microwave frequency. In some embodiments, the trenches have a periodicity not exceeding fifty micrometers. Each trench may have a width not exceeding twenty micrometers. Each trench may have a height not exceeding twenty micrometers and not less than three micrometers. In some embodiments, the trenches have a fill therein. The fill may be vacuum and/or an insulating cladding. Thus, the effective microwave index for such embodiments corresponds to the substrate material and the fill. In some embodiments, a portion of the plurality of trenches are under a portion of the electrode. In some embodiments, the trenches extend through at least a portion of the insulator.

An integrated electro-optic device is described. The integrated electro-optic device includes a substrate, an insulator on the substrate, a first optical structure, and a second optical structure. The substrate includes a trench region having trenches therein. The trench region has an effective microwave index based on a substrate material and the trenches. The first and second optical structures are on the substrate. The first optical structure includes a first photonics material. The second optical structure includes a thin film electro-optic layer including lithium. In some embodiments, the first optical structure is a silicon photonics optical structure such as a silicon photonics waveguide. For example, a silicon photonics optical structure may be on the insulator and between the second optical structure and the insulator. In some embodiments, the insulator has a thickness not exceeding three micrometers.

A method for providing an optical device is described. The method includes providing trenches in a trench region of a substrate. Thus, the trench region has an effective microwave index corresponding to a substrate material and the plurality of trenches. An insulator is provided on the substrate. An optical structure is provided on the insulator. The optical structure has a thin film electro-optic layer including lithium. An electrode is provided proximate to a portion of the optical structure. The electrode may be configured to carry an electrode signal having a microwave frequency. In such embodiments, the trenches have a periodicity smaller than half of a wavelength corresponding to the microwave frequency.

In some embodiments, providing the trenches includes etching the trenches into the substrate. Providing the insulator may include cladding the substrate with an insulating layer and planarizing the insulating layer. In some embodiments, the cladding is performed before the etching of the plurality of trenches. Thus, the trenches may extend through the insulator. Providing the trenches may also include at least partially filling the plurality of trenches using a fill. In some embodiments, the fill includes a vacuum and/or an insulating cladding. Thus, the effective microwave index corresponds to the substrate material and the fill. In some embodiments, the effective microwave index is less than 2.5.

FIG. 1 depicts a cross-sectional view of a portion of an embodiment of electro-optic device 100. FIG. 1 is not to scale. Electro-optic device 100 includes substrate 101, insulator 102 (e.g. BOX layer 102 in the embodiment shown), and optical structure 112 (i.e. waveguide 112 in the embodiment shown). In the embodiment shown, waveguide 112 is formed from thin film electro-optic (TFEO) materials that may contain lithium. Lithium-containing TFEO layer 110 has been formed into ridge waveguide 112 and slab 114. In some embodiments, optical structure 112 may have another function and/or a different geometry. Cladding (not shown) is typically present and covers waveguide 112 as well as other structures that are not shown. For example electrooptic device 100 may include electrodes and/or other structures. Further, waveguide 112 may have other features including but not limited to tapers and/or mode converters.

Substrate 101 may include or consist of one or more materials such as silicon. In other embodiments, other materials may be used. BOX layer 102 may be or include a material such as $SiO_2$. Although various structures are described herein as "layers" in some embodiments, a layer may include sublayers. In some embodiments, BOX layer 102 is relatively thin. For example, in some embodiments, BOX layer 102 is less than five micrometers thick. In some embodiments, BOX layer 102 is not more than three micrometers thick (e.g. may be less than three micrometers thick). In some embodiments, BOX layer 102 is not more than two micrometers thick. In some embodiments, BOX layer 102 is at least one micrometer thick. In some embodiments, BOX layer 102 is at least eight hundred nanometers thick. BOX layer 102 may be sufficiently thick to electrically isolate waveguide 112 from substrate 101 and/or structures (e.g. CMOS components) that are formed on or in substrate 101. However, BOX layer 102 may not be sufficiently thick to substantially prevent a microwave mode from a microwave signal carried by electrodes (not shown) at or near BOX layer 102 from penetrating substrate 101.

Waveguide 112 is used to transmit an optical signal. In the embodiment shown, waveguide 112 is a ridge waveguide. However, in some embodiments, waveguide 112 is a channel waveguide. For example, slab 114 of TFEO material be removed. Waveguide 112 may include one or more lithium-containing electro-optic materials and is a thin film waveguide. In some embodiments, the waveguide 112 is a Si waveguide. In such embodiments, waveguide 112 may be a channel waveguide and slab 114 omitted. In some embodiments, the waveguide 112 is TFEO waveguide that includes or consists of thin film lithium niobate (TFLN) and/or thin film lithium tantalate (TFLT). TFEO layer (e.g. TFLN and/or TFLT) 110 may have a thickness not exceeding ten micrometers in electro-optic devices. In some embodiments, TFEO layer 110 has a thickness of not more than one micrometer. In some embodiments, the thickness of TFEO layer 110 may be not more than seven hundred nanometers. In some such embodiments, the thickness may be not more than four hundred nanometers. Other thicknesses are possible. When used in electro-optic devices, TFEO layer 110 forms optical structures such as ridge waveguide 112 and/or channel waveguides used in optical modulators, mode converters, polarization beam rotators, and/or other optical devices.

To fabricate waveguide 112, the lithium-containing TFEO layer 110 may undergo a physical etch, for example using dry etching, reactive ion etching (ME), inductively coupled plasma RIE. In some embodiments, a chemical etch and/or electron beam etch may be used. Waveguide 112 may thus have improved surface roughness. For example, the sidewall(s) of ridge 112 may have reduced surface roughness. For example, the short range root mean square surface roughness of a sidewall of ridge waveguide 112 is less than ten nanometers. In some embodiments, this root mean square surface roughness is not more than five nanometers. In some cases, the short range root mean square surface roughness does not exceed two nanometers. Waveguide 112 may have the optical losses in the range described above. In some embodiments, the height of ridge 112 is selected to provide a confinement of the optical mode such that there is a 10 dB reduction in intensity from the intensity at the center of ridge 112 at ten micrometers from the center of ridge 112. For example, the height of ridge 112 is on the order of a few hundred nanometers in some cases. However, other heights are possible in other embodiments.

Trenches 120 are formed in substrate 101. For clarity, only two trenches are labeled in FIG. 1. In the embodiment shown, trenches 120 are also formed in BOX layer 102. In some embodiments, trenches 120 are lithographically formed (e.g. via etching). In some such embodiments, the sidewalls of trench 120 may be substantially vertical or sloped so that the bottom of trench 120 is narrower than the top of trench 120. Thus, trenches 120 may not undercut the remaining substrate material (e.g., the remaining silicon substrate 101 or the remaining BOX layer 102). In the embodiment shown, trenches 120 have a constant spacing (i.e. a constant pitch). In some embodiments, the pitch is not constant. A set of trenches 120 extends over a length 1. In some embodiments, the periodicity of trenches 120 (e.g. the distance from a wall of one trench 120 across the trench to the wall of the next trench) is smaller than half the microwave wavelength for the electrical (e.g. microwave) signal carried by the electrodes (not shown). In some embodiments, the periodicity is not more than three hundred micrometers (e.g. for a wavelength of six hundred micrometers or more). In some embodiments the periodicity is not more than one hundred micrometers (e.g. for a wavelength of six hundred micrometers or more). In some embodiments, the periodicity is not more than fifty micrometers. In some embodiments, the periodicity is not more than thirty micrometers. In some embodiments, the periodicity is not more than twenty micrometers. In some embodiments, the periodicity is at least five micrometers. Other periodicities are possible.

Trenches 120 have a height, h, and a width, w. In some embodiments, different trenches 120 may have different heights and/or widths. The aspect ratio (h/w) of trenches 120 may be larger than 1, and high in some embodiments. For example, the aspect ratio may be at least two. In some embodiments, the aspect ratio may be greater than 3 and greater than 5 in some such embodiments). For example, trench 120 may be five to ten micrometers wide and five to twenty micrometers deep in some embodiments. The width of trench 120 may be not more than ten micrometers. In some embodiments, the width of trench 120 does not exceed five micrometers. In some embodiments, trench 120 does not exceed one micrometer in width. Each of trenches 120 may have a height not exceeding fifteen micrometers. For example, in some embodiments, trench 120 may be at least five micrometers thick and not more than fifteen micrometers thick. In some such embodiments, the height of trench 120 may not be more than ten micrometers. The trench height may be at least three micrometers, and at least five micrometers in some embodiments. In some embodiments, the trench height is at least the distance a microwave mode for a microwave signal carried in the electrodes is expected to penetrate into the substrate. Other widths and/or heights are possible. The density of trenches 120, distribution of trenches 120, height and/or width of trenches, periodicity of the trenches 120, and footprint of the trench region may also be tailored. Various configurations are possible depending upon the desired effective microwave index.

In some embodiments, trenches 120 are empty (e.g. may have a vacuum or air filling). If a vacuum fill is desired, the tops of trenches 120 are generally closed off. In other embodiments, trenches have another fill such as an insulator. In some embodiments, the fill for trenches 120 is insulating cladding. For example, the fill may be or include $SiO_2$. In some embodiments, trenches 120 are completely filled, while in other embodiments trenches are not completely filled. For example, trench 120 may be partially filled with SiO$_2$ and partially filled with air or vacuum. Thus, in the region of the trenches 120, the substrate has an effective microwave index. The effective microwave index corresponds to the substrate material (e.g. silicon and BOX layer 102 material) and the fill of trenches 120 (e.g. vacuum or cladding). For example, the effective microwave index for the region of trenches 120 may be a combination of the substrate microwave index and the trench microwave index (e.g. the microwave index for the fill of the trenches). In some embodiments, the effective microwave index is less than 3. In some such embodiments, the effective microwave index is not more than 2.5. In some embodiments, the effective microwave index is not more than 2.4. In some embodiments, the effective microwave index is not more than 2.3 and/or at least 2.1. Further, although indicating as extending only under a region adjacent to the sides of waveguide 112, trenches 120 may extend a different distance. For example, additional trenches further from waveguide 112 and/or under waveguide 112 may be provided.

The use of trenches 120 (e.g. how trenches 120 are configured and laid out) as well as the fill (e.g. SiO$_2$) allows the effective microwave index of the trench region to be tailored to be different than the microwave index of the substrate. Use of the effective index of refraction may improve performance of the device. In some configurations, substrates that may otherwise be unusable in the electro-optic device because of the substrate microwave index, may be incorporated into the electro-optic device. For example, silicon has a high microwave index. In some cases, the microwave index is close to 3.4. Use of a thick BOX layer (e.g. five through fifteen micrometers) allows the microwave mode to remain mostly or completely in the BOX layer. However, thinner BOX layers may be desired in some electro-optic devices. If BOX layer 102 is thin (e.g. approximately one micrometer thick) and no trench region is incorporated, a significant portion of the microwave mode experiences the microwave index of the silicon substrate. This may make velocity matching between the optical mode of TFLN and/or TFLT waveguide 112 (which may have an optical group index between 2 and 2.5, often approximately 2.2) and the microwave mode (which experiences a substrate microwave index of 3.4) of a signal carried by electrodes (not shown) challenging. In contrast, use of the trench region may provide an effective microwave index that may be in the ranges described herein. For example, the effective microwave index of the trench region may be determined by the fraction of the volume of the area of the trench region occupied by trenches 120 multiplied by the index of refraction of the fill (e.g. SiO$_2$ and/or vacuum) added to the fraction of the trench region occupied by substrate 101 multiplied by the index of refraction of substrate 101 added to the fraction of the trench region occupied by BOX layer 102 (if any) multiplied by the index of refraction of BOX layer 102. The size of individual trenches, aspect ratio of individual trenches, and periodicity of trenches provides a density of trenches and, therefore, the fill. This provides the effective microwave index of the material (substrate material combined with the fill material). The aspect ratio and density (and/or other aspects of the trenches) in combination with the fill material may provide an effective microwave index that is (for example) not more than 2.3 for a straight electrode. In some embodiments, a smaller effective microwave index may be attained. This lower effective index may allow for other designs, such as the use of electrodes having extensions (or segments), which may slow the microwave down. In some embodiments, the effective trench region is configured to allow for a velocity mismatch between optical modes in the waveguide and microwave modes in the electrodes of not more than three percent. For example, waveguide 112 may have an optical mode index of at least 2.2 and not more than 2.3. In such embodiments, the trench region may have an effective index of not more than 3.37 and greater than 2.13.

Electro-optic device 100 of FIG. 1 may have improved performance. The microwave index experienced by the microwave mode (not shown) includes the effective microwave index. The effective microwave index can be tailored to improve operation of the electro-optic device. For example, velocity matching between the optical signal carried by the waveguide and the microwave signal carried by the electrodes (not shown) may be improved. This may be achieved by configuring the size, density, and number of trenches 120 as well as the microwave index and amount of the fill used for trenches 120. For example, a velocity mismatch of not more than three percent may be achieved. Further, the thickness of BOX layer 120 may be tailored (e.g.) based on considerations other than and/or in addition to the microwave mode. For example, BOX layer 102 may be thinner. Thus, performance may be improved.

Figure 2:
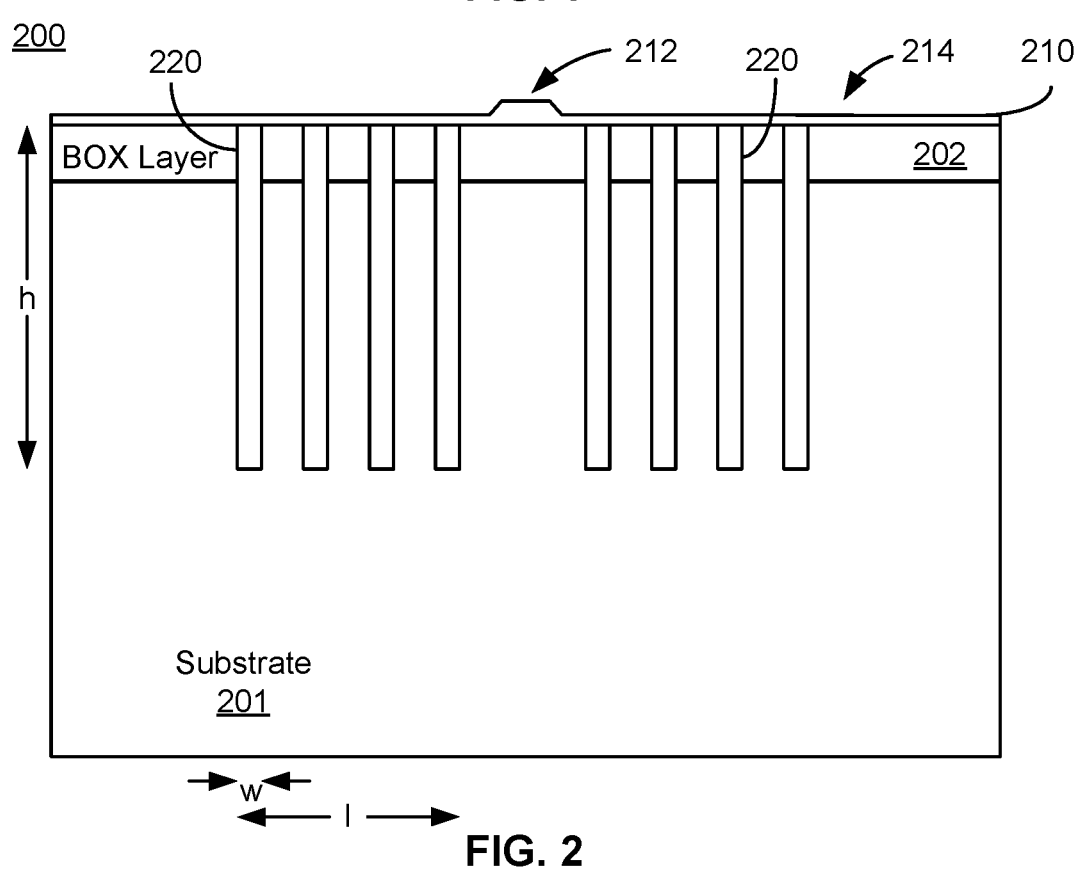
FIG. 2 depicts a cross-sectional view of a portion of an embodiment of an electro-optic device.

FIG. 2 depicts a cross-sectional view of a portion of an embodiment of electro-optic device 200 including substrate 201, insulator 202 (e.g. a BOX layer in the embodiment shown), and optical structure 212 (i.e. waveguide 212 in the embodiment shown). FIG. 2 is not to scale. The electro-optic device shown in FIG. 2 and the components therein are analogous to those shown in FIG. 1. Thus, substrate 201, BOX layer 202, lithium-containing TFEO (or other) layer 210, waveguide 212, slab 214 (if present), and trenches 220 (including any fill) are analogous to substrate 101, BOX layer 102, lithium-containing TFEO (or other) layer 110, waveguide 112, slab 114 (if present), and trenches 120 (including any fill). However, the width of trenches 220 has been increased. Thus, trenches 220 having other widths may be used. Although the number of trenches 220 has been reduced, in some embodiments, more trenches may be present. Further, the height of trenches 220 may be changed.

Electro-optic device 200 of FIG. 2 may share the benefits of electro-optic device 100 of FIG. 1. The microwave index experienced by the microwave mode (not shown) includes the effective microwave index. The effective microwave index can be tailored to improve operation of electro-optic device 200 by configuring trenches 220 and their fill (not shown). For example, velocity matching between the optical signal carried by the waveguide and the microwave signal carried by the electrodes (not shown) may be improved. Further, the thickness of the BOX layer may be tailored based on considerations other than and/or in addition to the microwave mode. Thus, performance may be improved.

Figure 3:
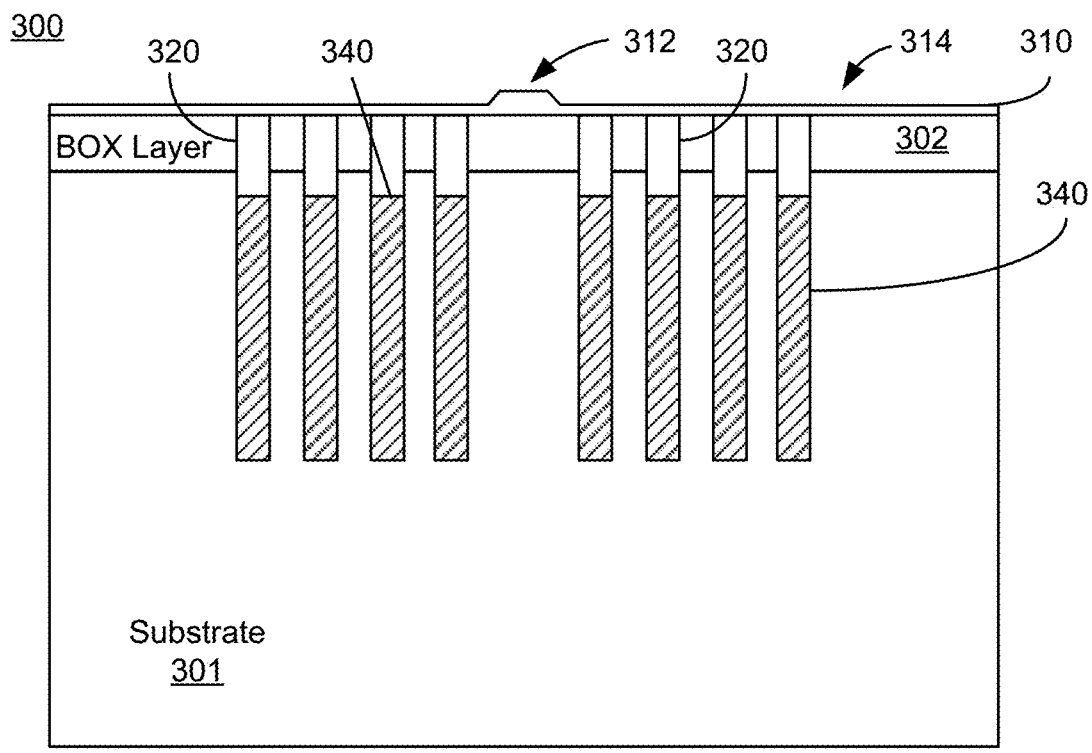
FIG. 3 depicts a cross-sectional view of a portion of an embodiment of an electro-optic device.

FIG. 3 depicts a cross-sectional view of a portion of an embodiment of electro-optic device 300 including substrate 301, insulator 302 (e.g. BOX layer 302 in the embodiment shown), and optical structure 312 (i.e. waveguide 312 in the embodiment shown). FIG. 3 is not to scale. Electro-optic device 300 shown in FIG. 3 and the components therein are analogous to those shown in FIGS. 1-2. Thus, substrate 301, BOX layer 302, lithium-containing TFEO (or other) layer 310, waveguide 312, slab 314 (if present), and trenches 320 (including any fill) are analogous to substrate 101 and 201, BOX layer 102 and 202, lithium-containing TFEO (or other) layer 110 and 210, waveguide 112 and 212, slab 114 and 214 (if present), and trenches 120 and 220 (including any fill). In addition, fill 340 that partially fills trenches 320 has also been shown. Although shown as extending from the bottom of trenches 320 upward, fill 340 may extend inward from the sides of the trench 320. This may occur when fill 340 is conformally deposited. Although depicted as partially filling trenches 320, in some embodiments, fill 340 may entirely fill trenches 320. In some embodiment, fill 340 may close the top of trenches 320, but leave void(s) within one or more of trenches 320. The fill may be insulating. The fill may be selected to have index(es) of refraction that provide the desired effective microwave index for the trench region and/or the substrate. Cladding (not shown) is typically present.

Electro-optic device 300 of FIG. 3 may share the benefits of electro-optic device 100 and/or 200 of FIGS. 1-2. The microwave index experienced by the microwave mode (not shown) includes the effective microwave index. The effective microwave index can be tailored to improve operation of electro-optic device 300. Further, the thickness of BOX layer 302 may be tailored (e.g.) based on considerations other than and/or in addition to the microwave mode. Thus, performance may be improved.

Figure 4:
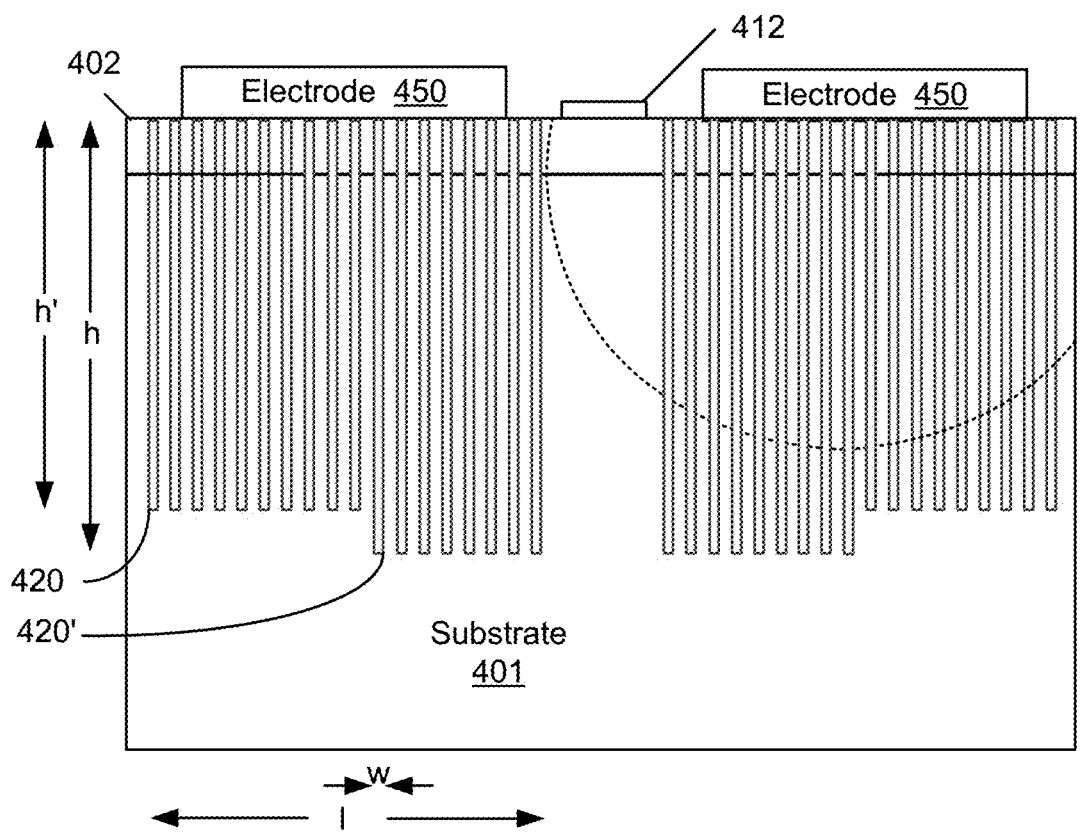
FIG. 4 depicts a cross-sectional view of a portion of an embodiment of an electro-optic device.

FIG. 4 depicts a cross-sectional view of a portion of an embodiment of electro-optic device 400 including substrate 401, insulator 402 (e.g. BOX layer 402 in the embodiment shown), and optical structure 412 (i.e. waveguide 412 in the embodiment shown). FIG. 4 is not to scale. Electro-optic device 400 shown in FIG. 4 and the components therein are analogous to those shown in FIGS. 1-3. Thus, substrate 401, BOX layer 402, waveguide 412, and trenches 420 and 420' (including any fill) are analogous to substrate 101, 201, and 301, BOX layer 102, 202, and 302, waveguide 112, 212, and 312, and trenches 120, 220, and 320 (including any fill). Waveguide 412 is shown as a channel waveguide, but may have another form (e.g. a ridge waveguide) in some embodiments, Electrode 450 are also explicitly shown. Although not explicitly depicted, trenches 420 and 420' may be partially or completely filled. In addition, in the embodiment shown, trenches 420 and 420" may have different heights, h and h'. In other embodiments, trenches 420 and 420' may have the same height. Although shown as having the same width, in some embodiments, trenches 420 and 420' may have different widths. Trenches 420 and 420' are shown as being not only between electrodes 450 and waveguide 412, but also extending under electrodes 450 and being further from waveguide 412 than electrodes 450 are. In some embodiments, trenches 420 and 420' may extend under waveguide 412. Other configurations of trenches 420 and 420' are possible. Waveguide 412 may be a TFLN and/or a TFLT waveguide. For a TFLN and/or TFLT waveguide, the trenches 420 may be desired to be completely filled to improve the adherence of the LN and/or LT layer to BOX layer 402. In some embodiments, waveguide 412 may be a Si waveguide. Further, as discussed above, although depicted as a channel waveguide, the waveguide may be a ridge waveguide. Cladding (not shown) is typically present.

Also shown in the device of FIG. 4 are electrodes 450. For example, electro-optic device 400 may be an optical modulator. Electrodes 450 are configured to carry an electrical signal, typically in the microwave range. In some embodiments, electrodes 450 may include extensions and/or other structures. The extent of the microwave mode in substrate 401 and BOX layer 402 for one of electrodes 450 is shown. As can be seen in FIG. 4, some or all of the microwave mode in substrate 401 may be in the same region as the trenches 420 and 420'. As a result, some or all of the microwave mode in the substrate experiences an effective microwave index that is a combination of the microwave index due to the trenches (e.g. the fill in the trenches) and the substrate.

Electro-optic device 400 of FIG. 4 may share the benefits of the electro-optic device(s) 100, 200, and/or 300 of FIGS. 1-3. The microwave index experienced by the microwave mode includes the effective microwave index due to a combination of trenches 420 and 420' and substrate 401. The characteristics of trenches 420 and 420', the fill, and substrate 401 can be selected such that the effective microwave index enhances performance. Further, the thickness of BOX layer 402 may be tailored (e.g.) based on considerations other than and/or in addition to the microwave mode. Thus, performance may be improved.

Figure 5:
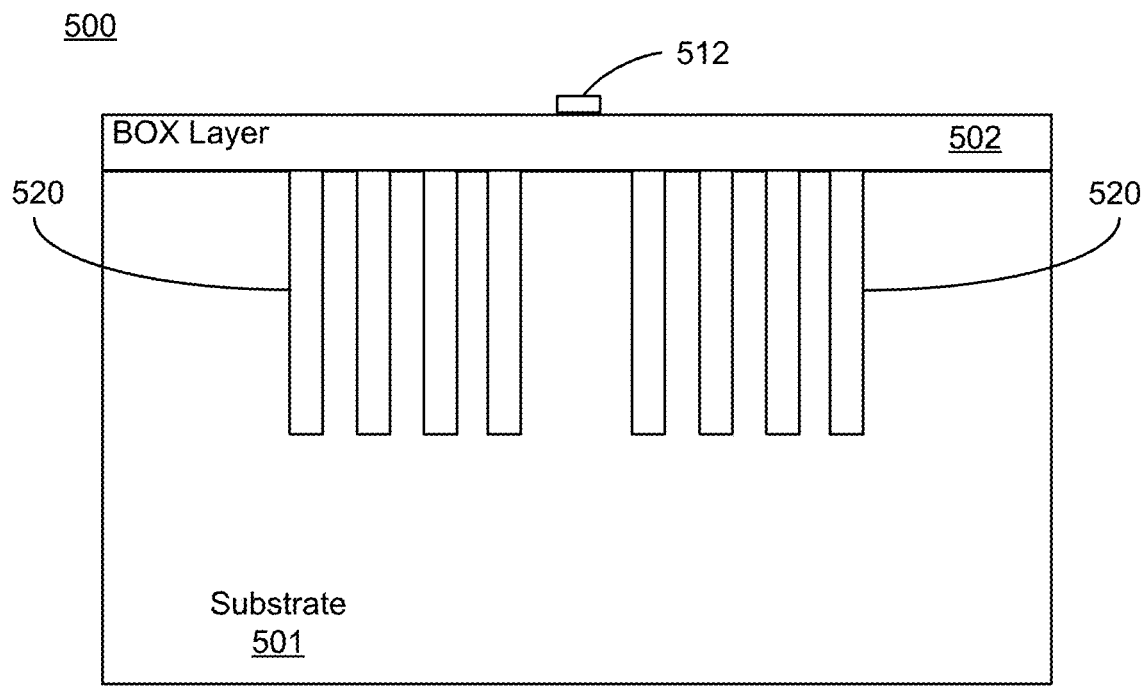
FIG. 5 depicts a cross-sectional view of a portion of an embodiment of an electro-optic device.

FIG. 5 depicts a cross-sectional view of a portion of an embodiment of electro-optic device 500 including substrate 501, an insulator 502 (e.g. BOX layer 502 in the embodiment shown), and optical structure 512 (i.e. waveguide 512 in the embodiment shown). FIG. 5 is not to scale. The electro-optic device 500 shown in FIG. 5 and the components therein are analogous to those shown in FIGS. 1-4. Although not explicitly indicated, trenches 520 may be partially or completely filled. Waveguide 512 may be a TFLN and/or a TFLT waveguide. For a TFLN and/or TFLT waveguide, trenches 520 may be desired to be completely filled to improve the adherence of the LN and/or LT layer to BOX layer 502. In some embodiments, waveguide 512 may be a Si waveguide. Further, as discussed above, although depicted as a channel waveguide, waveguide 502 may be a ridge waveguide. Cladding (not shown) is typically present.

Trenches 520 in FIG. 5 do not extend through BOX layer 502. In some embodiments, trenches 520 may be formed prior to BOX layer 502. In other embodiments, the trenches 520 may be formed after the BOX layer 502 and apertures (not shown) in BOX layer 502 refilled.

Electro-optic device 500 of FIG. 5 may share the benefits of electro-optic device(s) 100, 200, 300, and 400 of FIGS. 1-4. The microwave index experienced by the microwave mode includes the effective microwave index due to a combination of trenches 520 and substrate 501. The characteristics of trenches 520, the fill (not shown), and substrate 501 can be selected such that the effective microwave index enhances performance. For example, velocity matching between the optical signal carried by waveguide 512 and the microwave signal carried by the electrodes (not shown) may be improved. Further, the thickness of BOX layer 502 may be tailored (e.g.) based on considerations other than and/or in addition to the microwave mode. Thus, performance may be improved.

Figure 6:
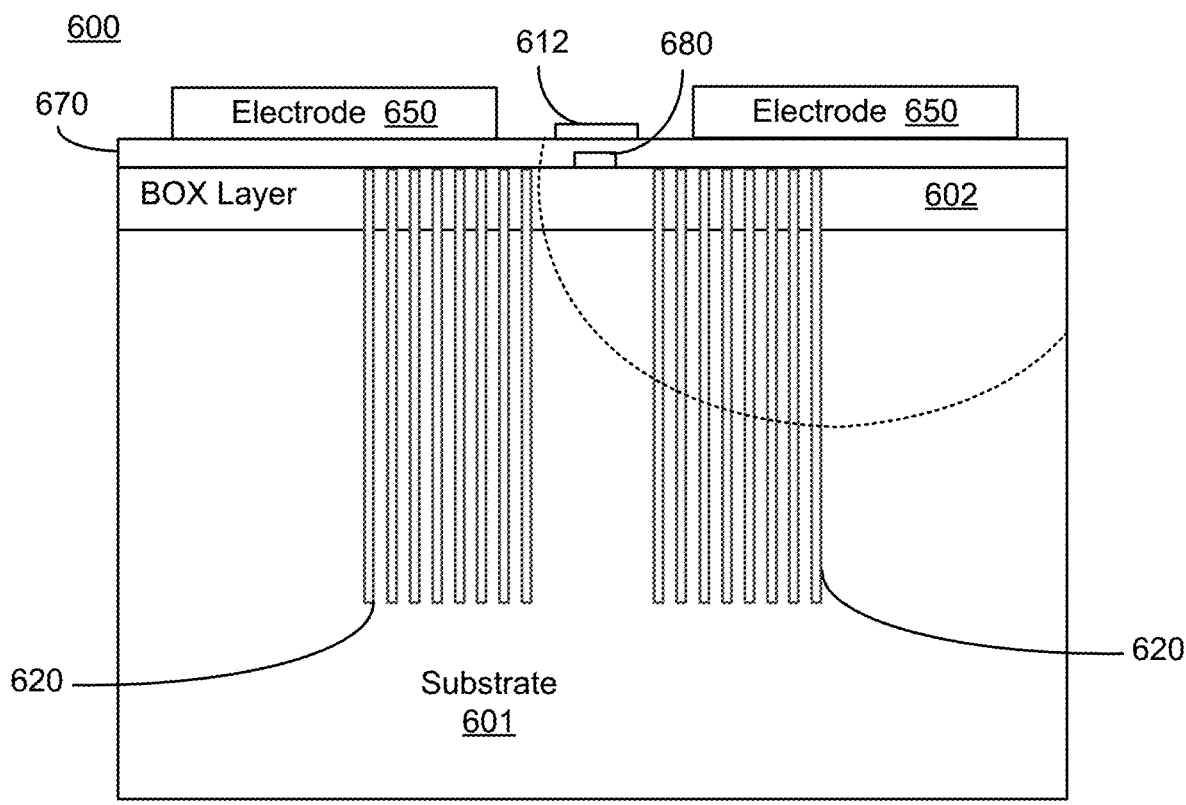
FIG. 6 depicts a cross-sectional view of a portion of an embodiment of an integrated heterogeneous electro-optic device.

FIG. 6 depicts a cross-sectional view of a portion of an embodiment of heterogeneous integrated electro-optic device 600. FIG. 6 is not to scale. Heterogeneous integrated electro-optic device includes substrate 601, insulator 602 (e.g. BOX layer 602 in the embodiment shown), and an optical structure 612 (i.e. waveguide 680 directly on BOX layer 602 in the embodiment shown) that are analogous to those shown in FIGS. 1-5. Waveguide 680 residing directly on BOX layer 602 is a Si waveguide in the embodiment shown. The heterogeneous integrated electro-optic device 600 also includes additional insulator 670 on BOX layer 602 and Si waveguide 680, electrodes 650, and a TFLN and/or TFLT waveguide 612. Cladding (not shown) is typically present and covers the TFLN/TFLT waveguide 612 and electrodes 650. Also indicated is the microwave mode for the electrodes.

Trenches 620, BOX layer 602, and waveguide are formed 680. After formation of the Si waveguide 680, the additional insulator 670 may be provided on BOX layer 602. Additional insulator 670 may also be $SiO_2$. In some embodiments, the combination of BOX layer 602 and additional insulator 670 have a thickness in the ranges described for BOX layer 102, 202, 302, 402, and 502. Other thicknesses are possible. To form TFLN/TFLT waveguide 612, a layer of LN (and/or LT) may be provided on the insulator 670. The TFLN and/or TFLT are etched to form optical structures such as the TFLN/TFLT waveguide 612. Electrodes 650 and cladding are also provided. Thus, a heterogeneous integrated Si and TFLN/TFLT electro-optic device 600 may be formed.

Electro-optic device 600 of FIG. 6 may share the benefits of the electro-optic device of FIGS. 1-5. The microwave index experienced by the microwave mode includes the effective microwave index due to a combination of trenches 620 and substrate 601. The characteristics of trenches 620, the fill, and substrate 601 can be selected such that the effective microwave index enhances performance. For example, velocity matching between the optical signal carried by the waveguide 612 and the microwave signal carried by the electrodes 650 may be improved. Further, the thickness of BOX layer 602 may be tailored (e.g.) based on considerations other than and/or in addition to the microwave mode. Moreover, a SiPh device and a TFLN/TFLT electro-optic device may be integrated. Thus, performance may be improved.

Figure 7A:
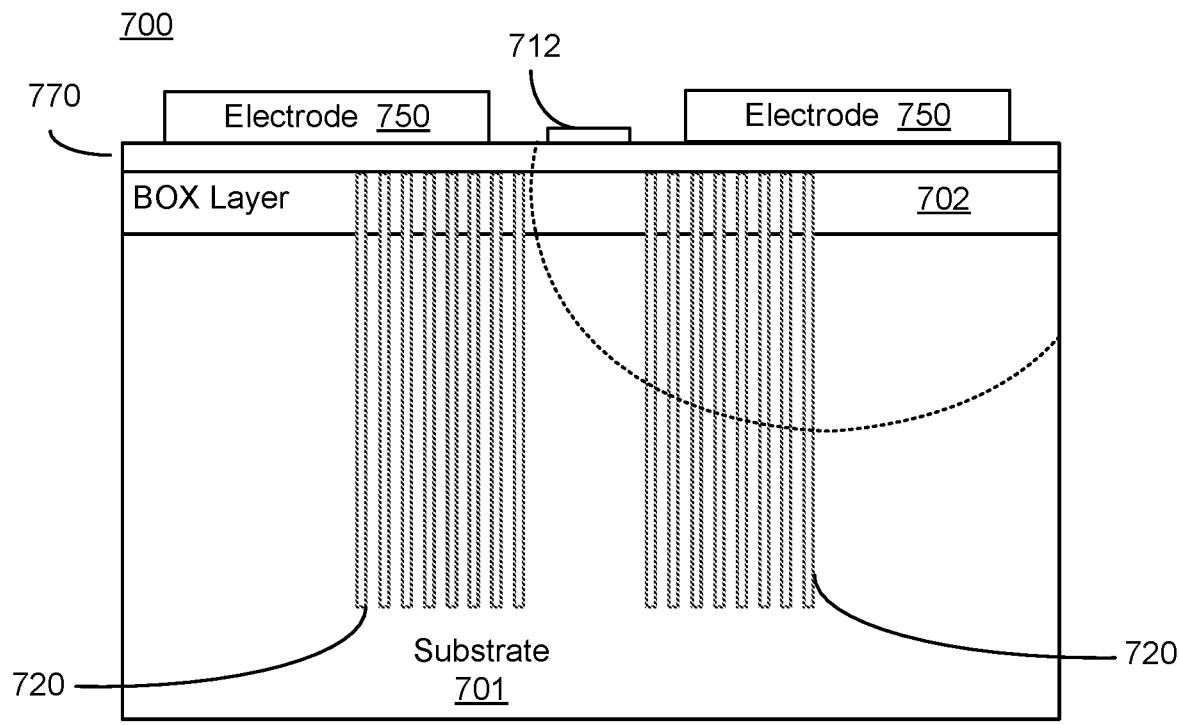
FIGS. 7A and 7B depict cross-sectional views of portions of embodiments of an electro-optic device.
Figure 7B:
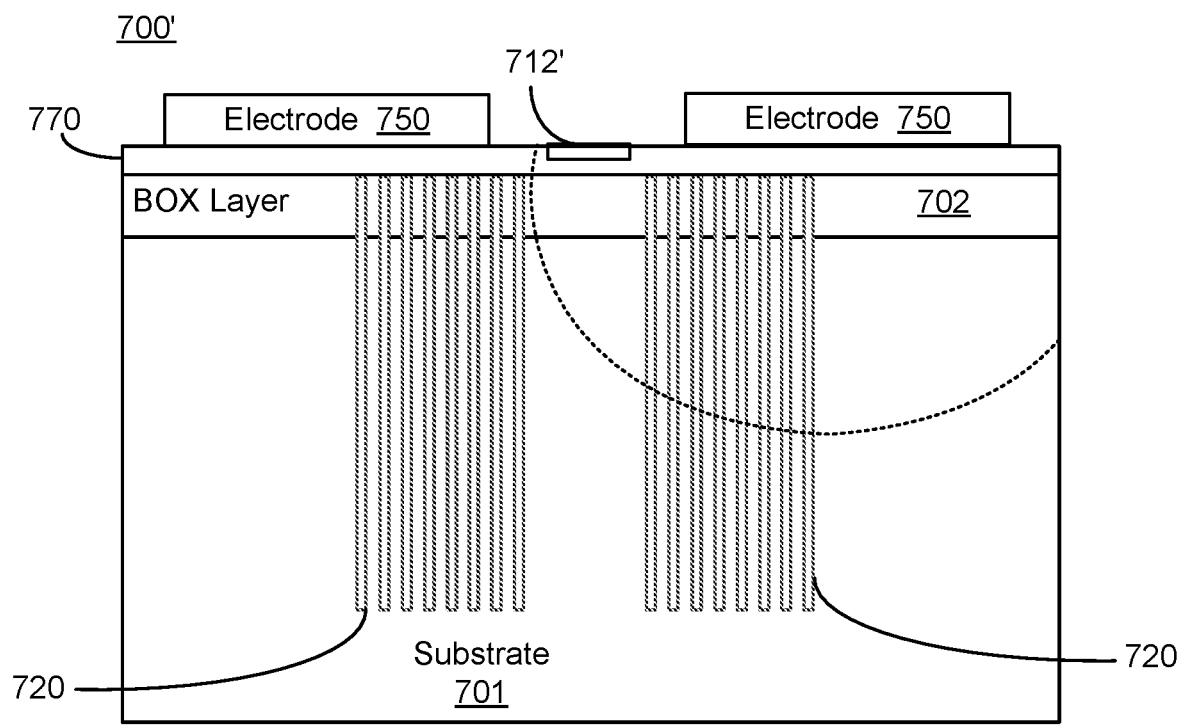

FIGS. 7A and 7B depict cross-sectional views of portions of embodiments of electro-optic devices 700 and 700', respectively. Electro-optic devices 700 and 700' each include substrate 701, insulator 702 (e.g. BOX layer 702 in the embodiment shown), and optical structures 712 or 712' (i.e. waveguides 712 and 712' in the embodiment shown). Cladding (not shown) is typically present. FIGS. 7A-7B are not to scale. The electro-optic devices 700 and 700' shown in FIGS. 7A-7B and the components therein are analogous to those shown in FIGS. 1-6. Although not explicitly depicted, trenches 720 may be partially or completely filled. Additional insulator 770 on the BOX layer and under waveguide 712 and adjacent to waveguide 712' is also shown.

In the embodiment shown, trenches 720 are shown as being not only between the electrodes 750 and the waveguides 712 and 712', but also extending under the waveguide(s) 712 or 712'. Trenches 720 may also have height (or a depth) of at least five micrometers and not more than fifteen micrometers. Other heights are possible. Other configurations of the trenches 720 (e.g. heights, widths, number, and/or location) are possible. The waveguide(s) 712 and/or 723' may be TFLN and/or TFLT waveguides. The additional insulator may improve the adherence of the LN and/or LT layer to BOX layer 702. In some embodiments, the waveguide 712 and/or 712' are channel waveguides. In other embodiments, the waveguide 712 and/or 712' may be a ridge waveguide. Also shown in the device of FIG. 7 are electrodes 750. For example, electro-optic devices 700 and 700' may be TFLN/TFLT optical modulators. Electrodes 730 are configured to carry an electrical signal, typically in the microwave range. In some embodiments, electrodes 750 may include extensions and/or other structures.

Electro-optic devices 700 and 700' of FIGS. 7A and 7B may share the benefits of the electro-optic device 100, 200, 300, 400, 500, and/or 600 of FIGS. 1-6. The microwave index experienced by the microwave mode includes the effective microwave index due to a combination of trenches 720 and substrate 701. The characteristics of trenches 720, the fill, and substrate 701 can be selected such that the effective microwave index enhances performance. Further, the thickness of BOX layer 702 may be tailored (e.g.) based on considerations other than and/or in addition to the microwave mode. Thus, performance may be improved.

Figure 8:
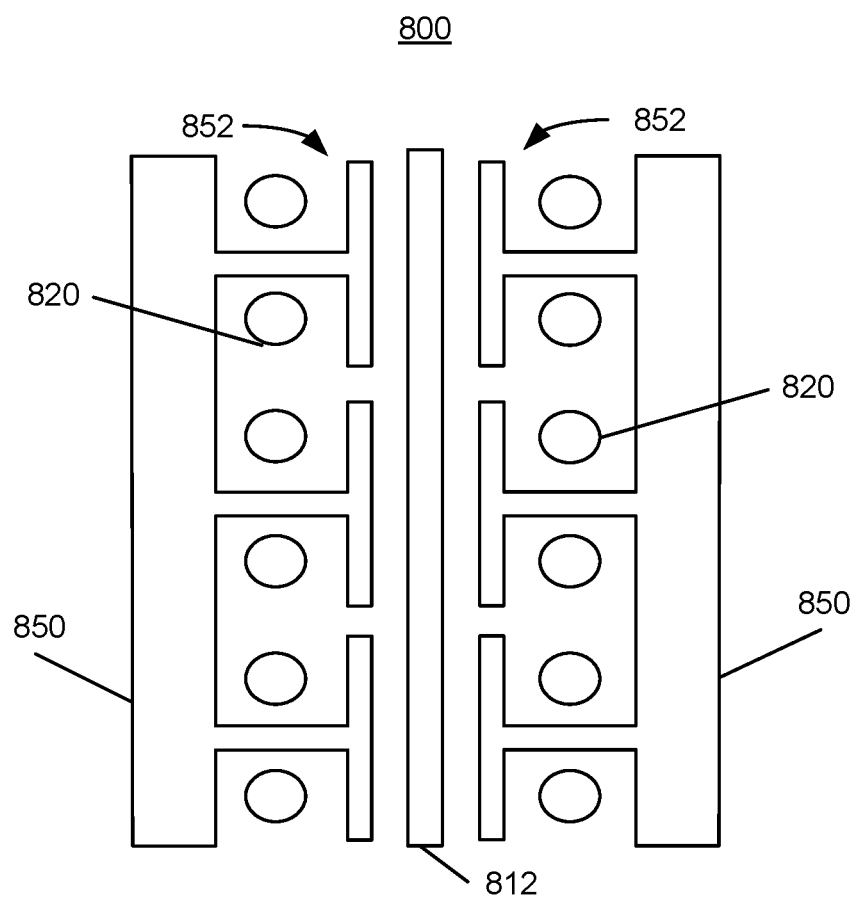
FIG. 8 depicts a plan view of a portion of an embodiment of an electro-optic device.

FIG. 8 depicts a plan view of a portion of an embodiment of electro-optic device 800 including a substrate (not explicitly shown), an insulator (not explicitly shown), optical structure 812 (i.e. waveguide 812 in the embodiment shown), and electrodes 850 including extensions 852. Cladding (not shown) is typically present. FIG. 8 is not to scale. The electro-optic device 800 shown in FIG. 8 and the components therein are analogous to those shown in FIGS. 1-7. Although not explicitly depicted, trenches 820 may be partially or completely filled. Trenches 820 are depicted as being between extensions 852 and having a circular footprint. Other configurations of trenches 820 are possible. Waveguide 812 may be a TFLN and/or a TFLT waveguide. For a TFLN and/or TFLT waveguide, trenches 820 may be desired to be completely filled to improve the adherence of the LN and/or LT layer to the BOX layer. As discussed above, although depicted as a channel waveguide, waveguide 812 may be a ridge waveguide.

Electro-optic device 800 of FIG. 8 may share the benefits of the electro-optic devices 100, 200, 300, 400, 500, 600, 700, and/or 700' of FIGS. 1-7B. The microwave index experienced by the microwave mode includes the effective microwave index due to a combination of trenches 820 and the substrate. The characteristics of trenches 820, the fill, and the substrate can be selected such that the effective microwave index enhances performance. For example, velocity matching between the optical signal carried by waveguide 812 and the microwave signal carried by electrodes 850 may be improved. Velocity matching may be further improved through the use of extensions 852 on electrode 850. The thickness of the BOX layer may be tailored (e.g.) based on considerations other than the microwave mode. Thus, performance may be improved.

Figure 9:
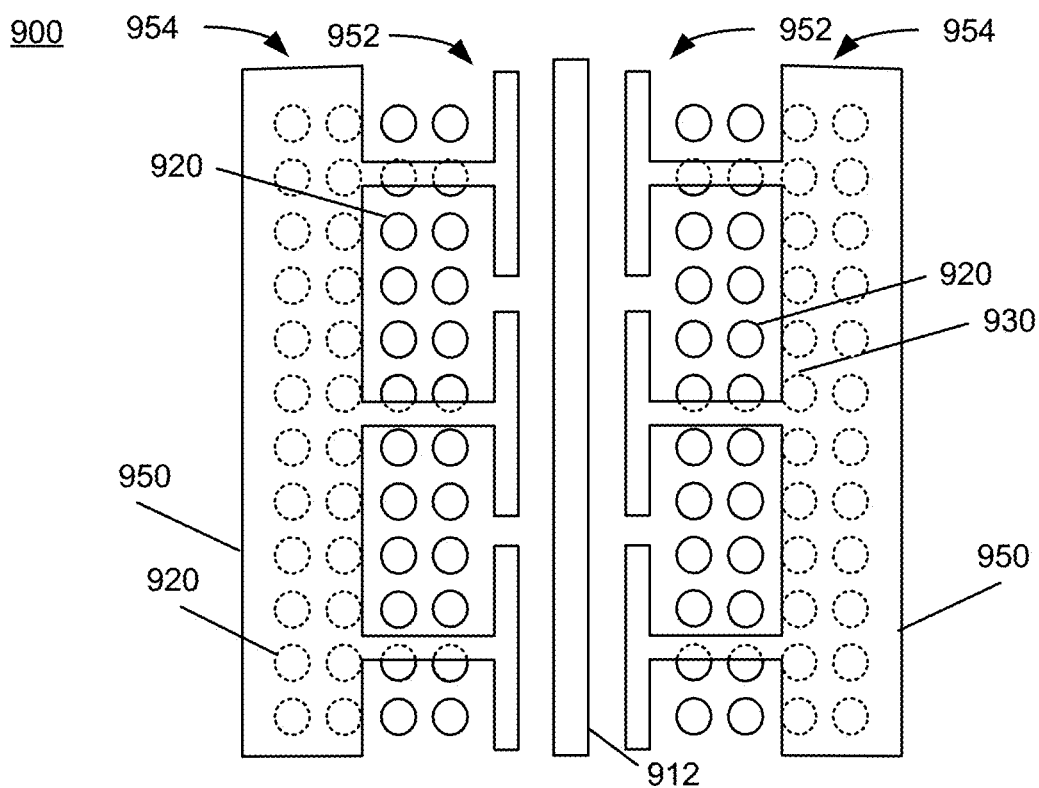
FIG. 9 depicts a plan view of a portion of an embodiment of an electro-optic device.

FIG. 9 depicts a plan view of a portion of an embodiment of electro-optic device 900 including a substrate (not explicitly shown), an insulator (not explicitly shown), optical structure 912 (i.e. a waveguide in the embodiment shown), and electrodes 950 including extensions 952 and channel regions 954. Cladding (not shown) is typically present. FIG. 9 is not to scale. The electro-optic device 900 shown in FIG. 9 and the components therein are analogous to those shown in FIGS. 1-8. Although not explicitly depicted, trenches 920 may be partially or completely filled. Trenches are depicted as having a circular footprint. Trenches 920 also extend under the channel region 954 of electrodes 950 as well as under extensions 952. Other configurations of trenches 920 are possible. Waveguide 912 may be a TFLN and/or a TFLT waveguide. For a TFLN and/or TFLT waveguide, trenches 920 may be desired to be completely filled to improve the adherence of the LN and/or LT layer to the BOX layer. As discussed above, although depicted as a channel waveguide, waveguide 912 may be a ridge waveguide.

The electro-optic device 900 of FIG. 9 may share the benefits of the electro-optic device(s) of FIGS. 1-8. The microwave index experienced by the microwave mode includes the effective microwave index due to a combination of trenches 920 and the substrate. The characteristics of trenches 920, the fill, and the substrate can be selected such that the effective microwave index enhances performance. The thickness of the BOX layer may be tailored (e.g.) based on considerations other than and/or in addition to the microwave mode. Thus, performance may be improved.

Figure 10:
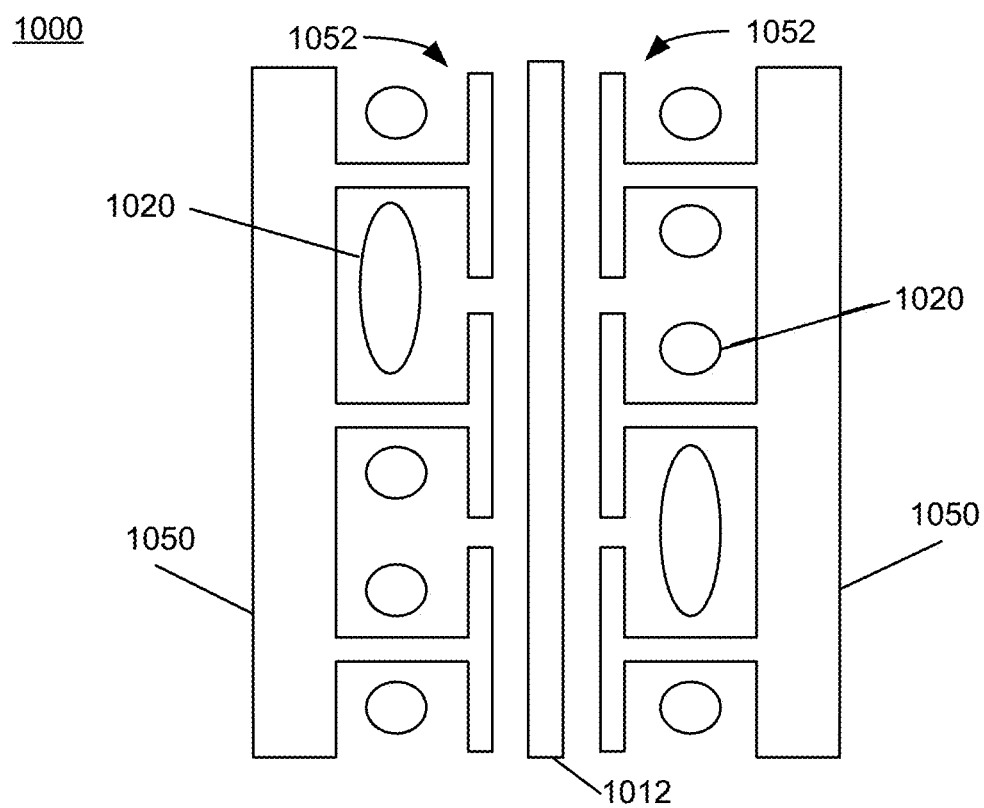
FIG. 10 depicts a plan view of a portion of an embodiment of an electro-optic device.

FIG. 10 depicts a plan view of a portion of an embodiment of electro-optic device 1000 including a substrate (not explicitly shown), an insulator (not explicitly shown), optical structure 1012 (i.e. waveguide 1012 in the embodiment shown), and electrodes 1050 including extensions 1052.

Cladding (not shown) is typically present. FIG. 10 is not to scale. The electro-optic device 1000 shown in FIG. 10 and the components therein are analogous to those shown in FIGS. 1-9. Although not explicitly depicted, trenches 1020 may be partially or completely filled. Trenches 1020 are depicted as having circular or oval footprint. Thus, in addition to trenches 1020 having varying heights, widths, and locations, the footprint(s) of trenches 1020 may vary. Thus, other configurations of trenches 1020 are possible. Waveguide 1012 may be a TFLN and/or a TFLT waveguide. For a TFLN and/or TFLT waveguide, trenches 1020 may be desired to be completely filled to improve the adherence of the LN and/or LT layer to the BOX layer. As discussed above, although depicted as a channel waveguide, waveguide 1012 may be a ridge waveguide.

The electro-optic device 1000 of FIG. 10 may share the benefits of the electro-optic devices 100, 200, 300, 400, 500, 600, 700, 700', 800, and 900 of FIGS. 1-9. The microwave index experienced by the microwave mode includes the effective microwave index due to a combination of trenches 1020 and the substrate. The characteristics of trenches 1020, the fill, and the substrate can be selected such that the effective microwave index enhances performance. For example, velocity matching between the optical signal carried by waveguide 1012 and the microwave signal carried by electrodes 1050 may be improved. Velocity matching may be further improved through the use of extensions 1052 on electrodes 950. The thickness of the BOX layer may be tailored (e.g.) based on considerations other than the microwave mode. Thus, performance may be improved.

Figure 11:
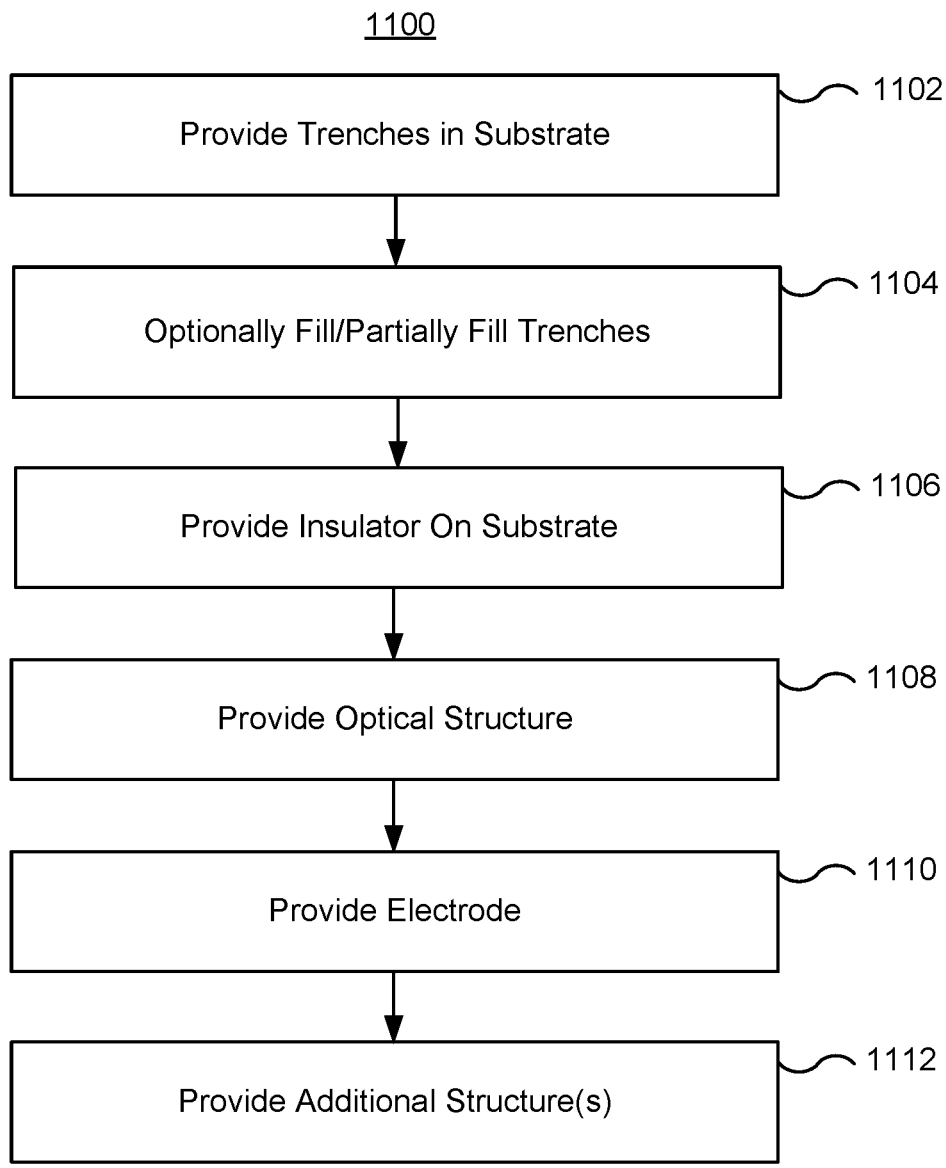
FIG. 11 is a flow chart depicting an embodiment of a method for providing an electro-optic device.

FIG. 11 is a flow-chart depicting method 1100 for providing an optical device. Method 1100 is described in the context of processes that may have sub-processes. Although described in a particular order, another order not inconsistent with the description herein may be utilized.

Trenches are provided in a substrate, at 1102. In some embodiments, 1102 may be performed photolithographically. For example, providing the trenches may include masking the substrate and etching the trenches into the substrate. The trenches may optionally be filled, at 1104. In some embodiments, 1104 may be skipped. The filling at 1104 may partially or completely fill the trench. In some embodiments, the fill is conformally grown on the trench (e.g. at least partially from the walls of the trench inward). Thus, even if filled, the trench may have voids therein.

An insulator is provided In the substrate, at 1106. The insulator is used for the BOX layer. Providing the insulator at 1106 may include cladding the substrate with an insulating layer and planarizing the insulating layer. In some embodiments, 1106 is performed before the etching of the trenches at 1102. In such embodiments, the trenches may extend through the insulator. One or more optical structures are provided, at 1108. For example, a lithium-containing TFEO waveguide may be formed. In some embodiments, another structure such as a SiPh waveguide might be fabricated. Electrodes for the waveguide may be formed at 1110. Additional structures may also be provided, at 1112. For example, if a SiPh waveguide is formed at 1108, 1112 may include providing an insulating layer on the SiPh waveguide and fabricating a lithium containing TFEO layer therein.

Using method 1100, an electro-optic device having a tailored microwave index of refraction may be provided. Thus, electro-optic device(s) 100, 200, 300, 400, 500, 600, 700, 700', 800, 900, 1000, and/or some combination of feature(s) thereof may be formed. The electro-optic devices so formed may share the benefits of the electro-optic devices described herein. The microwave index experienced by the microwave mode includes the effective microwave index due to a combination of trenches formed at 1102 and the substrate. The characteristics of trenches, the fill provided at 1104 (if any), and the substrate can be selected such that the effective microwave index enhances performance. For example, velocity matching between the optical signal carried by the waveguides and the microwave signal carried by the electrodes may be improved. Velocity matching may be further improved through the use of extensions on the electrodes. The thickness of the BOX layer may be tailored (e.g.) based on considerations other than the microwave mode. Thus, performance of the optical devices may be improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An electro-optic device, comprising:
a substrate including a trench region having a plurality of trenches therein, the trench region having an effective microwave index based on a substrate material and the plurality of trenches, wherein the plurality of trenches include a first row of trenches and a second row of trenches, and wherein the first row of trenches and the second row of trenches are non-intersecting;
an insulator on the substrate;
an optical structure on the insulator, the optical structure having a thin film electro-optic layer including lithium; and
an electrode proximate to a portion of the optical structure, wherein the electrode forms a grating in plan view, wherein the grating includes a plurality of chambers, wherein at least one chamber of the plurality of chambers is not completely enclosed in plan view, and wherein the at least one chamber surrounds at least one trench in plan view, and wherein the electro-optic device includes one or more of the following:
a fill that partially fills at least one trench of the plurality of trenches;
the first trench having a different length than the second trench;
the plurality of trenches not extending through the insulator;
an additional insulator being provided on the insulator; and/or
the plurality of trenches being disposed between the electrode and the optical structure and also extending under the optical structure, wherein an opening of a trench of the plurality of trenches has an oval shaped footprint.

2. The electro-optic device of claim 1, wherein the electrode is configured to carry an electrode signal having a microwave frequency and wherein the plurality of trenches has a periodicity smaller than half of a wavelength corresponding to the microwave frequency.

3. The electro-optic device of claim 1, wherein the plurality of trenches has a periodicity not exceeding fifty micrometers.

4. The electro-optic device of claim 1, wherein each of the plurality of trenches has a width not exceeding twenty micrometers.

5. The electro-optic device of claim 1, wherein each of the plurality of trenches has a height not exceeding twenty micrometers and not less than three micrometers.

6. The electro-optic device of claim 1, wherein the plurality of trenches has the fill including at least one of a vacuum or an insulating cladding, the effective microwave index corresponding to the substrate material and the fill.

7. The electro-optic device of claim 1, wherein the insulator does not exceed three micrometers in thickness.

8. The electro-optic device of claim 1, wherein a portion of the plurality of trenches are under a portion of the electrode.

9. The electro-optic device of claim 1, further comprising:
a photonics structure between the optical structure and the plurality of trenches.

10. The electro-optic device of claim 8, wherein the photonics structure includes a silicon photonics waveguide.

11. The electro-optic device of claim 1, wherein the effective microwave index is less than 2.5.

12. An integrated electro-optic device, comprising:
a substrate including a trench region having a plurality of trenches therein, the trench region having an effective microwave index based on a substrate material and the plurality of trenches, wherein the plurality of trenches include a first row of trenches and a second row of trenches, and wherein the first row of trenches and the second row of trenches are non-intersecting;
an insulator on the substrate;
a first optical structure on the substrate including a first photonics material; and
a second optical structure on the substrate and including a thin film electro-optic layer including lithium,
an electrode proximate to a portion of the first optical structure, wherein the electrode forms a grating in plan view, wherein the grating includes a plurality of chambers, wherein at least one chamber of the plurality of chambers is not completely enclosed in plan view, and wherein the at least one chamber surrounds at least one trench in plan view, and wherein the integrated electro-optic device includes one or more of the following:
a fill that partially fills at least one trench of the plurality of trenches;
the first trench having a different length than the second trench;
the plurality of trenches not extending through the insulator;
an additional insulator being provided on the insulator; and/or
the plurality of trenches being disposed between the electrode and the first optical structure and also extending under the first optical structure, wherein an opening of a trench of the plurality of trenches has an oval shaped footprint.

13. The integrated electro-optic device of claim 12, wherein the first optical structure is a silicon photonics optical structure.

14. The integrated electro-optic device of claim 13, wherein the insulator has a thickness not exceeding three micrometers, the first optical structure being on the insulator and between the second optical structure and the insulator.

15. A method, comprising:
providing a plurality of trenches in a trench region of a substrate, the trench region having an effective microwave index based on a substrate material and the plurality of trenches, wherein the plurality of trenches include a first row of trenches and a second row of trenches, and wherein the first row of trenches and the second row of trenches are non-intersecting;
providing an insulator on the substrate;
providing an optical structure on the insulator, the optical structure having a thin film electro-optic layer including lithium; and
providing an electrode proximate to a portion of the optical structure, wherein the electrode forms a grating in plan view, wherein the grating includes a plurality of chambers, wherein at least one chamber of the plurality of chambers is not completely enclosed in plan view, and wherein the at least one chamber surrounds at least one trench in plan view, and wherein the method includes one or more of the following:
a fill that partially fills at least one trench of the plurality of trenches;
the first trench having a different length than the second trench;
the plurality of trenches not extending through the insulator;
an additional insulator being provided on the insulator; and/or
the plurality of trenches being disposed between the electrode and the optical structure and also extending under the optical structure, wherein an opening of a trench of the plurality of trenches has an oval shaped footprint.

16. The method of claim 15, wherein the providing the plurality of trenches further includes:
etching the plurality of trenches into the substrate; and
wherein the providing the insulator further includes
cladding the substrate with an insulating layer; and
planarizing the insulating layer.

17. The method of claim 16, wherein the cladding is performed before the etching of the plurality of trenches.

18. The method of claim 15, wherein the electrode is configured to carry an electrode signal having a microwave frequency and wherein the plurality of trenches has a periodicity smaller than half of a wavelength corresponding to the microwave frequency.

19. The method of claim 15, wherein the providing the plurality of trenches further includes:
at least partially filling the plurality of trenches using the fill including at least one of a vacuum or an insulating cladding, the effective microwave index corresponding to the substrate material and the fill.

20. The method of claim 15, wherein the effective microwave index is less than 2.5.

21. The electro-optic device of claim 1, wherein the electro-optic device includes three or more of the following:
a fill that partially fills at least one trench of the plurality of trenches;
the first trench having a different length than the second trench;
the plurality of trenches not extending through the insulator;
an additional insulator being provided on the insulator; and/or
the plurality of trenches being disposed between the electrode and the optical structure and also extending under the optical structure.

22. The electro-optic device of claim 1, wherein the electro-optic device includes the following:
a fill that partially fills at least one trench of the plurality of trenches;
the first trench having a different length than the second trench;

the plurality of trenches not extending through the insulator;

an additional insulator being provided on the insulator; and the plurality of trenches being disposed between the electrode and the optical structure and also extending under the optical structure.

* * * * *